United States Patent
Nishiguchi et al.

(10) Patent No.: US 10,215,455 B2
(45) Date of Patent: Feb. 26, 2019

(54) HEAT TRANSMISSION METHOD AND HIGH-TEMPERATURE HEAT PUMP DEVICE

(71) Applicant: CENTRAL GLASS COMPANY, LIMITED, Yamaguchi (JP)

(72) Inventors: Yoshio Nishiguchi, Saitama (JP); Satoru Okamoto, Saitama (JP); Masatomi Kanai, Saitama (JP)

(73) Assignee: CENTRAL GLASS COMPANY, LIMITED, Yamaguchi (JP)

(*) Notice: Subject to any disclaimer, the term of this patent is extended or adjusted under 35 U.S.C. 154(b) by 178 days.

(21) Appl. No.: 15/043,074

(22) Filed: Feb. 12, 2016

(65) Prior Publication Data
US 2016/0178255 A1    Jun. 23, 2016

Related U.S. Application Data

(63) Continuation of application No. PCT/JP2014/071284, filed on Aug. 12, 2014.

(30) Foreign Application Priority Data

Aug. 14, 2013  (JP) ................ 2013-168752

(51) Int. Cl.
C09K 5/04      (2006.01)
F25B 30/02    (2006.01)
C10M 171/00  (2006.01)

(52) U.S. Cl.
CPC .......... *F25B 30/02* (2013.01); *C09K 5/045* (2013.01); *C10M 171/008* (2013.01); *C09K 2205/126* (2013.01); *F25B 2400/121* (2013.01)

(58) Field of Classification Search
CPC .... C09K 5/045; C09K 2205/126; F25B 30/02
See application file for complete search history.

(56) References Cited

U.S. PATENT DOCUMENTS

2008/0075673 A1   3/2008   Knopeck et al.
2010/0044619 A1   2/2010   Hulse et al.
(Continued)

FOREIGN PATENT DOCUMENTS

EP   2311923 A2   4/2011
EP   2878645 A1   6/2015
(Continued)

OTHER PUBLICATIONS

English translation of Written Opinion of the International Search Authority dated Nov. 18, 2014, for corresponding PCT/JP2014/071284. Previously filed.

(Continued)

*Primary Examiner* — John R Hardee
(74) *Attorney, Agent, or Firm* — Hauptman Ham, LLP

(57) ABSTRACT

A heat transmission method using a high-temperature heat pump system accommodating a heat transmission composition includes the step of evaporating the heat transmission composition, the step of compressing the heat transmission composition, the step of condensing the heat transmission composition, and the step of decreasing the pressure of the heat transmission composition at a temperature of 70° C. or higher, which are performed sequentially. The heat transmission composition contains cis-1,3,3,3-tetrafluoropropene at a mass ratio of 95.0% by mass or more and 99.9% by mass or less, and contains trans-1,3,3,3-tetrafluoropropene or 2,3,3,3-tetrafluoropropene at a mass ratio of 0.1% by mass or more and 5.0% by mass or less; and the heat transmission composition has a condensation temperature of 70° C. or higher.

17 Claims, 16 Drawing Sheets

(56) References Cited

U.S. PATENT DOCUMENTS

| | | | |
|---|---|---|---|
| 2011/0197602 A1 | 8/2011 | Abbas et al. | |
| 2013/0075063 A1 | 3/2013 | Hulse et al. | |
| 2014/0223935 A1* | 8/2014 | Rached .................. | C09K 5/045 62/115 |

FOREIGN PATENT DOCUMENTS

| | | | |
|---|---|---|---|
| JP | 2007-535611 | A | 12/2007 |
| JP | 2010-047754 | A | 3/2010 |
| JP | 2010-531925 | A | 9/2010 |
| JP | 2010-532411 | A | 10/2010 |
| JP | 2010-265472 | A | 11/2010 |
| JP | 2012-505946 | A | 3/2012 |
| JP | 2013-525720 | A | 6/2013 |
| JP | 2014-531499 | A | 11/2014 |
| WO | 2005/105947 | A2 | 11/2005 |
| WO | 2009/005854 | A1 | 1/2009 |
| WO | 2009/035893 | A1 | 3/2009 |
| WO | 2011/114029 | A1 | 9/2011 |
| WO | 2012/030613 | A2 | 3/2012 |
| WO | 2012/158870 | A1 | 11/2012 |
| WO | WO2013/030476 | * | 3/2013 |
| WO | 2013/048896 | A2 | 4/2013 |

OTHER PUBLICATIONS

Extended European Search Report dated May 24, 2017, for corresponding PCT/JP2014/071284.
International Search report dated Nov. 18, 2014, concerning PCT/JP2014/071284.
Written Opinion of the International Search Authority dated Nov. 18, 2014, concerning PCT/JP2014/071284.
Japanese Office Action dated Nov. 28, 2017 for corresponding Japanese Application No. 2015-531823 with partial translation.
Chinese Office Action dated Mar. 28, 2018 for the corresponding Chinese application No. 201480040188.0 with Partial English Translation.
European Office Action dated Jun. 22, 2018 for the corresponding European patent application No. 14835951.6.
Chinese Office Action dated Jan. 2, 2019 for the corresponding Chinese application No. 201480040188.0, with partial English Translation.

* cited by examiner

HEAT TRANSMISSION METHOD AND HIGH-TEMPERATURE HEAT PUMP DEVICE

CROSS REFERENCE TO RELATED APPLICATIONS

This application is based upon and claims the benefit of priority from the prior Japanese Patent Application No. 2013-168752, filed on Aug. 14, 2013, PCT Application No. PCT/JP2014/07128, filed on Aug. 12, 2014 and the entire contents of which are incorporated herein by reference.

FIELD

The present invention relates to a heat transmission method using a coolant for a high-temperature heat pump, the coolant being suitable for use at a condensation temperature of 70° C. or higher, and also to a high-temperature heat pump device.

BACKGROUND

In steel, petroleum, chemical, cement, paper and pulp, ceramic engineering, biomass and other industries, a once through steam boiler or the like is used, which generates steam by use of heat of combustion of a fossil fuel such as oil, gas or the like in order to supply a heat source for a heating step such as a drying step, a sterilization step or the like. Recently, energy savings and carbon dioxide emissions reduction are serious problems in industries. It is considered that a heating method using a heat pump reduces carbon dioxide emissions as compared with a conventional method of combusting a fossil fuel to supply heat.

A heat pump is generally used for cooling or heating in an air conditioning device or a hot water supply device.

Chlorofluorocarbon (CFC) or hydrochlorofluorocarbon (HCFC) each containing fluorine and chlorine are conventionally used as a coolant of a heat pump cycle, but use thereof has been stopped step by step from the viewpoint of ozone layer protection. Today, a natural coolant such as ammonia, carbon dioxide or the like and hydrofluorocarbon (HFC), which does not contain a chlorine atom in a molecule, are mainly used.

A heat pump known as a hot water supply device or a steam generation device uses HFC as a coolant. For example, PCT Japanese National Phase Laid-Open Patent Publication No. 2013-525720 discloses a coolant for a high-temperature heat pump, which has a condensation temperature of 70° C. to 150° C. This coolant contains 1,1,1,3,3-pentafluoropropane as a main component and contains 1,1,1,3,3-pentafluoroprobutane at a mass ratio of 20% by mass or less.

However, it is concerned that HFC, which has a high global warming potential (GWP), significantly contributes to the warming. Therefore, hydrofluoroolefin (HFO), which is a fluorine-containing unsaturated compound, is proposed as a substitute coolant having a low global warming potential.

For example, PCT Japanese National Phase Laid-Open Patent Publication No. 2007-535611 discloses using, as a coolant of an air conditioning device for an automobile, a composition containing 2,3,3,3-tetrafluoropropene (HFO) and polyalkyleneglycol (PAG) lubricant.

Japanese Laid-Open Patent Publication No. 2010-47754 discloses using, as a coolant of a low-temperature freezer, a mixed compound of tetrafluoropropene such as 2,3,3,3-tetrafluoropropene, 1,3,3,3-tetrafluoropropene or the like and difluoromethane.

SUMMARY

PCT Japanese National Phase Laid-Open Patent Publication No. 2013-525720 proposes an HFC mixed coolant for a high-temperature heat pump. Since this coolant has a high global warming potential of 794 to 1030, it is concerned that use thereof for a long time in the future may cause a problem.

PCT Japanese National Phase Laid-Open Patent Publication No. 2007-535611 and Japanese Laid-Open Patent Publication No. 2010-47754 each propose an air conditioning device of a steam compression cycle using a working fluid having a low GWP. The working fluid used in each of PCT Japanese National Phase Laid-Open Patent Publication No. 2007-535611 and Japanese Laid-Open Patent Publication No. 2010-47754 is a coolant suitable for use in air conditioning (cooling, heating). However, no example of applying such a coolant to a heat pump cycle for hot water supply or water vapor generation is described.

As described above, the level of performance of currently available high-temperature heat pumps using a coolant having a high level of environmental compatibility is still insufficient. Therefore, it is desired to find a heat transmission composition that is capable of performing heat transmission at a high temperature and contains, as a main component, a coolant providing superior heat transmission performance than a conventional coolant and having a low GWP.

The present invention made has an object of providing a novel heat transmission composition and a high-temperature heat pump device that are further improved. A preferable heat transmission working medium according to the present invention does not substantially contribute to global warming, unlike many types of hydrofluorocarbon currently used.

The present inventors performed active studies in order to solve the above-described problems. As a result, the present inventors paid attention to unsaturated halogenated hydrocarbon, and obtained knowledge that use thereof, especially, use of fluorinated propene as a heat transmission medium at a predetermined temperature and a predetermined pressure would provide a very effective heat transmission method. Thus, the present invention was completed.

An embodiment of the present invention is directed to a heat transmission method using a high-temperature heat pump system accommodating a heat transmission composition, the heat transmission method including the step of gasifying the heat transmission composition, the step of compressing the heat transmission composition, the step of condensing the heat transmission composition, and the step of decreasing the pressure of the heat transmission composition, which are performed sequentially. The heat transmission composition contains cis-1,3,3,3-tetrafluoropropene at a mass ratio of 95.0% by mass or more and 99.9% by mass or less, and contains trans-1,3,3,3-tetrafluoropropene or 2,3,3,3-tetrafluoropropene at a mass ratio of 0.1% by mass or more and 5.0% by mass or less; and the heat transmission composition has a condensation temperature of 70° C. or higher.

An embodiment of the present invention is directed to a heat transmission method using a high-temperature heat pump system accommodating a heat transmission composition, the heat transmission method including the step of gasifying the heat transmission composition, the step of compressing the heat transmission composition, the step of condensing the heat transmission composition, and the step of decreasing the pressure of the heat transmission composition, which are performed sequentially. The heat transmission composition contains cis-1,3,3,3-tetrafluoropropene at a mass ratio of 80.0% by mass or more and 99.9% by mass or less, and contains trans-1-chloro-3,3,3-trifluoropropene or 1,1,1,3,3-pentafluoropropane at a mass ratio of 0.1% by mass or more and 20.0% by mass or less; and the heat transmission composition has a condensation temperature of 70° C. or higher.

In the heat transmission composition method, the heat transmission composition may contain cis-1,3,3,3-tetrafluoropropene at a mass ratio of 90.0% by mass or more and 99.9% by mass or less, and contain 1,1,1,3,3-pentafluoropropane at a mass ratio of 0.1% by mass or more and 10.0% by mass or less.

In the heat transmission composition method, the heat transmission composition may contain cis-1,3,3,3-tetrafluoropropene at a mass ratio of 90.0% by mass or more and 99.9% by mass or less, and contain trans-1-chloro-3,3,3-trifluoropropene at a mass ratio of 0.1% by mass or more and 10.0% by mass or less.

In the heat transmission composition method, the heat transmission composition may contain a lubricant.

In the heat transmission composition method, the lubricant may be selected from mineral oil (paraffin-based oil or naphthene-based oil), and synthetic oils including alkylbenzenes (AB), poly(alfa-olefin), esters, polyolesters (POE), polyalkyleneglycols (PAG), polyvinylethers (PVE), and a combination thereof.

In the heat transmission composition method, the heat transmission composition may further contain a stabilizer.

In the heat transmission composition method, the stabilizer may be selected from nitro compounds, epoxy compounds, phenols, imidazoles, amines, diene-based compounds, phosphates, aromatic unsaturated hydrocarbons, isoprenes, propadienes, terpenes, and the like, and a combination thereof.

In the heat transmission composition method, the heat transmission composition may further contain a flame retardant.

In the heat transmission composition method, the flame retardant may be selected from phosphates, halogenated aromatic compounds, fluorinated iodocarbon, fluorinated bromocarbon, and the like, and a combination thereof.

In the heat transmission composition method, warm water, pressurized hot water or superheated steam of 60° C. or higher may be generated.

In the heat transmission composition method, warm water, pressurized hot water or superheated steam of 80° C. or higher may be generated.

In the heat transmission composition method, pressurized hot water or superheated steam of 110° C. or higher may be generated.

An embodiment of the present invention is directed to a high-temperature heat pump device using the heat transmission method described in any of the above.

REFERENCE SIGNS LIST

Figure 1:
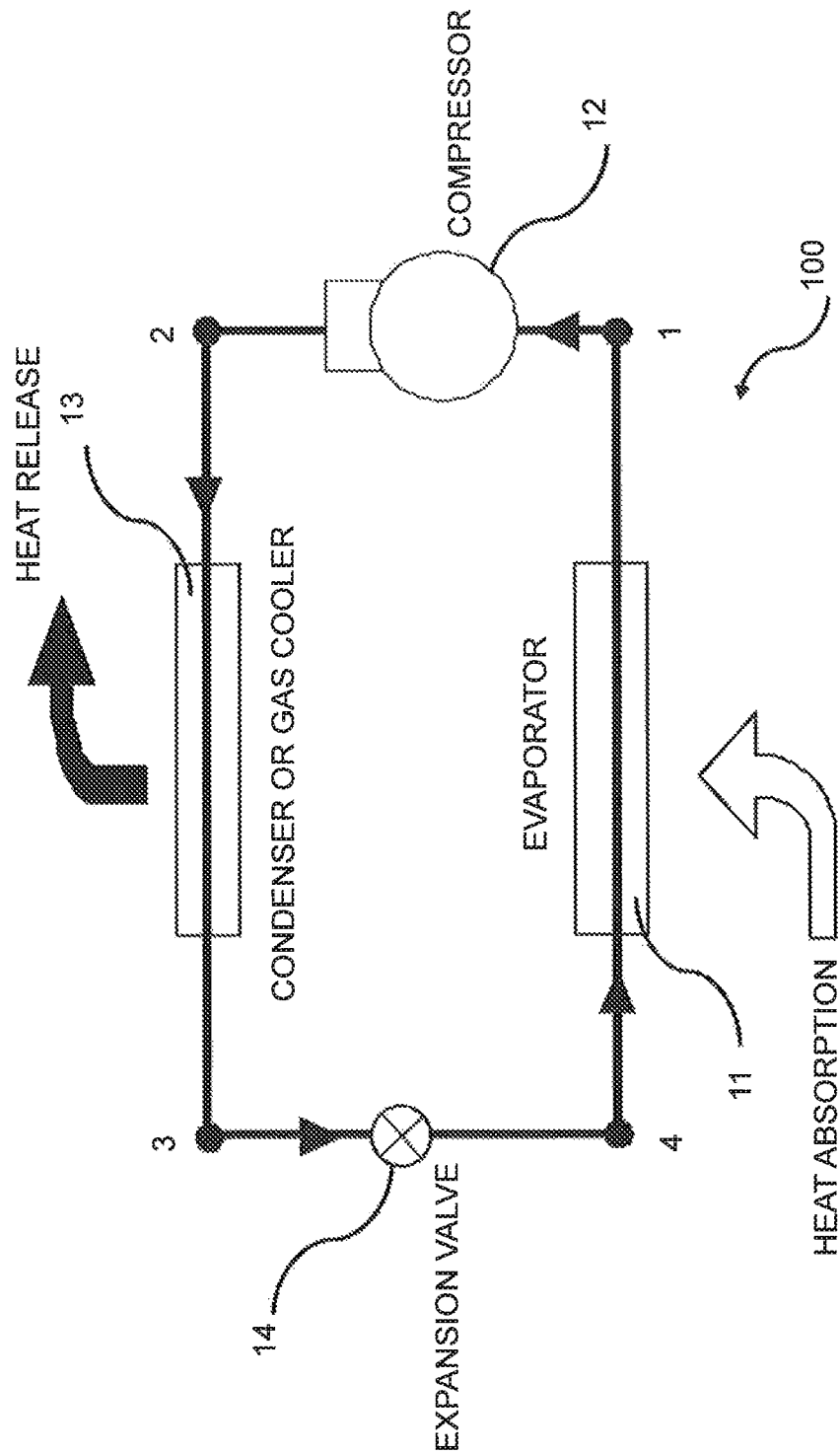
FIG. 1 is a schematic view of a high-temperature heat pump cycle to which a working medium according to the present invention is applicable.

11: evaporator; 12: compressor; 13: condenser; 14: expansion valve; 100: high-temperature heat pump device

EMBODIMENTS

Hereinafter, a heat transmission method and a high-temperature heat pump device according to the present invention will be described with reference to the drawings. The heat transmission method and the high-temperature heat pump device according to the present invention are not to be construed as being limited to the following embodiments or examples. In the drawings referred to in the embodiments and the examples, the same elements or elements having substantially the same functions will bear the same reference signs, and descriptions thereof will not be described in repetition.

A heat transmission method according to the present invention uses a heat transmission composition which is a mixture of cis-1,3,3,3-tetrafluoropropene and trans-1,3,3,3-tetrafluoropropene or 2,3,3,3-tetrafluoropropene. Alternatively, the heat transmission method according to the present invention uses a heat transmission composition which is a mixture of cis-1,3,3,3-tetrafluoropropene and trans-1-chloro-3,3,3-trifluoropropene or 1,1,1,3,3-pentafluoropropane. The present inventors have found that the heat transmission composition according to the present invention is such a mixture and therefore is non-flammable or slightly flammable, has little load on the environment and has superb heat cycle characteristics and heat transmission characteristics.

Cis-1,3,3,3-tetrafluoropropene (HFO-1234ze (Z)) will be described.

<HFO-1234ze (Z)>

HFO-1234ze (Z) contains a carbon-carbon double bond in a molecule and is highly reactive with a hydroxyl radical, and therefore has a very low global warming potential (GWP) and has little load on the environment. HFO-1234ze (Z) is slightly flammable or flame-resistant and has no toxicity. HFO-1234ze (Z) has a boiling point of 9.8° C. at an atmospheric pressure, an atmospheric lifetime of 10 days, and a global warming potential (GWP) of 3 (Chemical Physics Letters 2009, Vol. 473, pp. 233-237). HFO-1234ze (Z) has a critical temperature of 150.1° C. and a critical pressure of 3.54 MPa (4th IIR Conference on Thermophysical Properties and Transfer Processes of Refrigerant, Proceedings TP-018).

Trans-1,3,3,3-tetrafluoropropene (HFO-1234ze (E)) will be described.

<HFO-1234ze (E)>

HFO-1234ze (E) contains a carbon-carbon double bond in a molecule and is highly reactive with a hydroxyl radical, and therefore has a very low global warming potential (GWP) and has little load on the environment. HFO-1234ze (E) is slightly flammable or flame-resistant and has no toxicity. HFO-1234ze (E) has a boiling point of −19° C. at an atmospheric pressure, an atmospheric lifetime of 14 days, and a global warming potential (GWP) of 6 (Chemical Physics Letters 2007, Vol. 443, pp. 199-204). HFO-1234ze (E) has a critical temperature of 109.4° C. and a critical pressure of 3.63 MPa (Journal of Chemical Engineering Data 2010, Vol. 55, pp. 1594-1597).

2,3,3,3-tetrafluoropropene (HFO-1234yf) will be described.

<HFO-1234yf>

HFO-1234yf contains a carbon-carbon double bond in a molecule and is highly reactive with a hydroxyl radical, and therefore has a very low global warming potential (GWP) and has little load on the environment. HFO-1234yf is slightly flammable and has no toxicity. HFO-1234yf has a boiling point of −29° C. at an atmospheric pressure, an atmospheric lifetime of 11 days, and a global warming potential (GWP) of 4 (Chemical Physics Letters 2007, Vol. 439, pp. 18-22). HFO-1234yf has a critical temperature of 94.7° C. and a critical pressure of 3.38 MPa (International Journal of Refrigeration 2010, Vol. 33, pp. 474-479)

Now, trans-1-chloro-3,3,3-trifluoropropene (HCFO-1233zd (E)) will be described.

<HCFO-1233zd (E)>

HCFO-1233zd (E) contains a carbon-carbon double bond in a molecule and is highly reactive with a hydroxyl radical, and therefore has a very low global warming potential (GWP) and has little load on the environment. HCFO-1233zd (E) is slightly flammable or flame-resistant and has no toxicity. HCFO-1233zd (E) has a boiling point of 18.3° C. at an atmospheric pressure, an atmospheric lifetime of 26 days, and a global warming potential (GWP) of 7 (Journal of Photochemistry and Photobiology A: Chemistry 2008, Vol. 199, pp. 92-97). HCFO-1233zd (E) has a critical temperature of 109.4° C. and a critical pressure of 3.63 MPa (Journal of Chemical Engineering Data 2012, Vol. 57, pp. 3581-3586).

Now, 1,1,1,3,3-pentafluoropropane (HFC-245fa) will be described.

<HFC-245fa>

HFC-245fa is non-flammable and has a low level of toxicity. HFC-245fa has a boiling point of 15.3° C. at an atmospheric pressure, an atmospheric lifetime of 7.6 years, and a global warming potential (GWP) of 1030 (IPCC 4th Assessment Report, 2007).

HFC-245fa has a high global warming potential (GWP), and therefore, when being used, is contained preferably at 1% by mass or more and 20% by mass or less, and especially preferably at 1% by mass or more and 10% by mass or less.

In an embodiment, the heat transmission composition according to the present invention contains cis-1,3,3,3-tetrafluoropropene at a mass ratio of 95.0% by mass or more and 99.9% by mass or less, and contains trans-1,3,3,3-tetrafluoropropene or 2,3,3,3-tetrafluoropropene at a mass ratio of 0.1% by mass or more and 5.0% by mass or less. Owing to having such a composition, the heat transmission composition according to the present invention has a global warming potential of less than 150.

In an embodiment, the heat transmission composition according to the present invention contains cis-1,3,3,3-tetrafluoropropene at a mass ratio of 80.0% by mass or more and 99.9% by mass or less, and contains trans-1-chloro-3,3,3-trifluoropropene or 1,1,1,3,3-pentafluoropropane at a mass ratio of 0.1% by mass or more and 20.0% by mass or less. Owing to having such a composition, the heat transmission composition according to the present invention, as a coolant, has a global warming potential of less than 150.

Cis-1,3,3,3-tetrafluoropropene and trans-1-chloro-3,3,3-trifluoropropene or 1,1,1,3,3-pentafluoropropane have critical temperatures close to each other, and the critical temperature of the heat transmission composition according to the present invention containing such substances is not much influenced by the mass ratios of the substances. By contrast, the critical temperature of each of trans-1,3,3,3-tetrafluoropropene and 2,3,3,3-tetrafluoropropene is lower than the critical temperature of cis-1,3,3,3-tetrafluoropropene. Therefore, the critical temperature of the heat transmission composition according to the present invention containing such substances decreases as the mass ratio of trans-1,3,3,3-tetrafluoropropene or 2,3,3,3-tetrafluoropropene increases. For this reason, the heat transmission composition containing cis-1,3,3,3-tetrafluoropropene and trans-1,3,3,3-tetrafluoropropene or 2,3,3,3-tetrafluoropropene according to the present invention preferably contains trans-1,3,3,3-tetrafluoropropene or 2,3,3,3-tetrafluoropropene at 0.1% by mass or more and 5.0% by mass or less.

The heat transmission composition containing cis-1,3,3,3-tetrafluoropropene and trans-1-chloro-3,3,3-trifluoropropene or 1,1,1,3,3-pentafluoropropane contains cis-1,3,3,3-tetrafluoropropene at a mass ratio of 80.0% by mass or more, preferably at a mass ratio of 90.0% by mass or more and 99.9% by mass, and contains trans-1-chloro-3,3,3-trifluoropropene or 1,1,1,3,3-pentafluoropropane at a mass ratio of 0.1% by mass or more and 20.0% by mass or less, preferably at a mass ratio of 0.1% by mass or more and 10.0% by mass or less.

<Lubricant>

In the case where the heat transmission composition according to the present invention is used as a coolant of a high-temperature heat pump, a lubricant is used in a compressor sliding portion. Examples of the lubricant include mineral oil (paraffin-based oil or naphthene-based oil), and synthetic oils such as alkylbenzenes (AB), poly(alfa-olefin), esters, polyesters (POE), polyalkyleneglycols (PAG), and polyvinylethers (PVE).

In the case where the heat transmission composition according to the present invention is used as a working medium of a rankine cycle, a lubricant is used in an expander sliding portion. Examples of the lubricant include mineral oil (paraffin-based oil or naphthene-based oil), and synthetic oils such as alkylbenzenes (AB), poly(alfa-olefin), esters, polyesters (POE), polyalkyleneglycols (PAG), and polyvinylethers (PVE).

Usable alkylbenzenes include n-octylbenzene, n-nonylbenzene, n-decylbenzene, n-undecylbenzene, n-dodecylbenzene, n-tridecylbenzene, 2-methyl-1-phenylheptane, 2-methyl-1-phenyloctane, 2-methyl-1-phenylnonane, 2-methyl-1-phenyldecane, 2-methyl-1-phenylundecane, 2-methyl-1-phenyldodecane, 2-methyl-1-phenyltridecane, and the like.

Usable esters include aromatic esters such as benzoic acid, phthalic acid, isophthalic acid, terephthalic acid, trimellitic acid, pyromellitic acid, a mixture thereof and the like; dibasic acid ester; polyolester; complex ester; carbonate ester; and the like.

Alcohols which are materials of polyolesters include, for example, esters of hindered alcohol such as neopentylglycol, trimethylolethane, trimethylolpropane, trimethylolbutane, di-(trimethylolpropane), tri-(trimethylolpropane), pentaerythritol, di-(pentaerythritol), tri-(pentaerythritol), and the like.

Carboxylic acids which are materials of polyolesters include valeric acid, caproic acid, enathic acid, caprylic acid, pelargonic acid, capric acid, oleic acid, isopentanoic acid, 2-methylhexanoic acid, 2-ethylpentanoic acid, 2-ethylhexanoic acid, 3,5,5-trimethylhexanoic acid, and the like.

A usable example of polyalkyleneglycol is a compound obtained by addition polymerization of aliphatic alcohol having a carbon number of 1 or more and 18 or less, such as methanol, ethanol, linear or branched propanol, linear or branched butanol, linear or branched pentanol, linear or branched hexanol or the like, with ethylene oxide, propylene oxide, butylene oxide or the like.

Usable polyvinylethers include polymethylvinylether, polyethylvinylether, poly-n-propylvinylether, polyisopropylvinylether, and the like.

<Stabilizer>

The heat transmission composition according to the present invention may contain a stabilizer in order to improve the thermal stability, oxidation resistance and the like thereof. Examples of the stabilizer include nitro compounds, epoxy compounds, phenols, imidazoles, amines, hydrocarbons, and the like.

Usable nitro compounds include known compounds, for example, aliphatic and/or aromatic derivatives. Usable aliphatic nitro compounds include, for example, nitromethane, nitroethane, 1-nitropropane, 2-nitropropane, and the like. Usable aromatic nitro compounds include, for example, nitrobenzene, o-, m- or p-dinitrobenzene, trinitrobenzene, o-, m- or p-nitrotoluene, o-, m- or p-ethylnitrobenzene, 2,3-, 2,4-, 2,5-, 2,6-, 3,4- or 3,5-dimethylnitrobenzene, o-, m- or p-nitroacetophenone, o-, m- or p-nitrophenol, o-, m- or p-nitroanisole, and the like.

Usable epoxy compounds include, for example, monoepoxy-based compounds such as ethyleneoxide, 1,2-butyleneoxide, propyleneoxide, styreneoxide, cyclohexeneoxide, glycidol, epichlorhydrin, glycidylmethacrylate, phenylglycidylether, allylglycidylether, methylglycidylether, butylglycidylether, 2-ethylhexylglycidylether, and the like; and polyepoxy-based compounds such as diepoxybutane, vinylcyclohexenedioxide, neopentylglycoldiglycidylether, ethyleneglycoldiglycidylether, glycerinepolyglycidylether, trimethylolpropanetriglycidylether, and the like.

Usable phenols may contain any of various substitutes such as an alkyl group, an alkenyl group, an alkoxy group, a carboxyl group, a carbonyl group, a halogen atom or the like as well as a hydroxy group. Such phenols include, for example, monovalent phenols such as 2,6-di-t-butyl-p-cresol, o-cresol, m-cresol, p-cresol, thymol, p-t-butylphenol, o-methoxyphenol, m-methoxyphenol, p-methoxyphenol, eugenol, isoeugenol, butylhydroxyanisole, phenol, xylenol, and the like; and divalent phenols such as t-butylcatechol, 2,5-di-t-aminohydroquinone, 2,5-di-t-butylhydroquinone, and the like.

Usable imidazoles contain, as a substitute at the N position, a linear or branched alkyl group, a linear or branched cycloalkyl group or a linear or branched aryl group having a carbon number of 1 or more and 18 or less. Such imidazoles include 1-methylimidazole, 1-n-butylimidazole, 1-phenylimidazole, 1-benzylimidazole, 1-(β-oxyethyl)imidazole, 1-methyl-2-propylimidazole, 1-methyl-2-isobutylimidazole, 1-n-butyl-2-methylimidazole, 1,2-dimethylimidazole, 1,4-dimethylimidazole, 1,5-dimethylimidazole, 1,2,5-trimethylimidazole, 1,4,5-trimethylimidazole, 1-ethyl-2-methylimidazole, and the like. These compounds may be used independently or in a combination of two or more.

Usable amines include pentylamine, hexylamine, diisopropylamine, diisobutylamine, di-n-propylamine, diallylamine, triethylamine, N-methylaniline, pyridine, morpholine, N-methylmorpholine, triallylamine, allylamine, α-methylbenzylamine, methylamine, dimethylamine, trimethylamine, ethylamine, diethylamine, propylamine, isopropylamine, dipropylamine, butylamine, isobutylamine, dibutylamine, tributylamine, dipentylamine, tripentylamine, 2-ethylhexylamine, aniline, N,N-dimethylaniline, N,N-diethylaniline, ethylenediamine, propylenediamine, diethylenetriamine, tetraethylenepentamine, benzylamine, dibenzylamine, diphenylamine, diethylhydroxylamine, and the like. These may be used independently or in a combination of two or more.

Usable hydrocarbons include aromatic unsaturated hydrocarbons such as α-methylstyrene, p-isopropenyltoluene, and the like; isoprenes; propadienes; terpenes; and the like. These may be used independently or in a combination of two or more.

The stabilizer may be added to one of, or both of, the coolant and the lubricant in advance, or may be put into the condenser independently. There is no specific limitation on the amount of the stabilizer, but the amount of the stabilizer is preferably 0.001% by mass or more and 10% by mass or less, more preferably 0.01% by mass or more and 5% by mass or less, and still more preferably 0.02% by mass or more and 2% by mass or less, with respect to the main coolant (100% by mass). In the case where the amount of the stabilizer exceeds the upper limit or less than the lower limit, the stability of the coolant, the heat cycle performance and the like are not provided sufficiently.

<Flame Retardant>

The heat transmission composition according to the present invention may contain a flame retardant in order to improve the flammability thereof. Examples of the flame retardant include phosphates, halogenated aromatic compounds, fluorinated iodocarbon, fluorinated bromocarbon, and the like.

The heat transmission medium according to the present invention having such a composition has a condensation temperature of 70° C. or higher, preferably 80° C. or higher, and more preferably 90° C. or higher and 140° C. or lower.

The condensation pressure of the heat transmission composition according to the present invention having such a composition is determined by the composition and the condensation temperature of the heat transmission composition. Namely, the condensation pressure is equal to the saturated steam pressure of the heat transmission composition at the condensation temperature. In general, when the condensation pressure of a heat transmission composition exceeds 5.0 MPa, the compressor, the condenser and pipes need to have a high level of pressure resistance. This is not preferable because the devices having such a high level of pressure resistance cost high. In the case where the heat transmission composition according to the present invention is used, the condensation pressure is lower than 5.0 MPa, and thus a known compressor, a known condenser and known pipes are usable.

The heat transmission composition according to the present invention is non-flammable, has little load on the environment, and has superb heat cycle characteristics. Therefore, the heat transmission composition according to the present invention is usable as a heat medium for a high-temperature heat pump usable to generate pressurized warm water, superheated steam or the like; as a working medium for an organic rankine cycle usable for a power generation system or the like; as a coolant for a steam compression-type freezing cycle system; as a medium for an absorption-type heat pump, a heat pipe or the like; a washing detergent for cycle washing of a cooling system or a heat pump system; as a metal washing detergent; as a flux washing detergent; as a dilution solvent; as a foaming agent, as an aerosol; or the like.

The heat transmission method according to the present invention is applicable for a packaged compact device (rankine cycle system, heat pump cycle system, etc.) and also for a power general system, a heat pump hot water supply system, a heat pump steam generation system or the like of a large plant scale.

Hereinafter, a high-temperature heat pump device using the heat transmission composition according to the present invention will be described in detail.

<High-Temperature Heat Pump Device>

A high-temperature heat pump device is a system that transfers heat of a substance to be cooled, for example, air, water, brine or the like, to a coolant, by an evaporator, as latent heat of evaporation of the coolant, applies work to, and thus compress, the generated coolant steam by the compressor, discharges the heat of condensation by the condenser to liquefy the coolant steam, subjects the condensed coolant to throttle expansion by an expansion valve so that the condensed coolant has a low pressure and a low temperature, and transfers the coolant to the evaporator to evaporate the coolant. In the evaporator, the coolant receives the thermal energy of the substance to be cooled, so that the substance to be cooled is cooled to decrease the temperature. In the condenser, the thermal energy of the coolant is given to a load fluid, so that the load fluid is heated to increase the temperature. The high-temperature heat pump device is applicable to a known system.

A fluid to be cooled or a fluid to be heated that is subjected to heat exchange with a coolant (heat transmission composition) in an evaporator or a condenser of the high-temperature heat pump device may be air, water, brine, silicone oil, or the like. One of such mediums is preferably selected in accordance with the temperature condition of cycle driving.

FIG. 1 is a schematic view showing an example of a high-temperature heat pump device to which the heat transmission composition according to the present invention is applicable. Hereinafter, a structure and an operation (repetition cycle) of a high-temperature heat pump device 100 shown in FIG. 1 will be described.

The high-temperature heat pump device 100 according to the present invention includes an evaporator 11 that receives heat and a condenser 13 that supplies heat. The high-temperature heat pump device 100 also includes a compressor 12 that increases the pressure of a working medium (heat transmission composition) steam that has exited from the evaporator 11 to consume electric power, and an expansion valve 14 that subjects the working medium supercooled liquid that has exited from the condenser 13 to throttle expansion.

In the case where the high-temperature heat pump cycle is repeated using the heat transmission composition according to the present invention, (a) through (d) below may be performed to obtain, as thermal energy, energy that is greater than the electric power put to the medium to be heated, by the condenser 13.

(a) The working medium in a liquid state in the heat exchanger (evaporator 11) is subjected to heat exchange with a fluid to be cooled (air, water, etc.), so that the working medium is gasified.

(b) The gasified working medium is removed from the heat exchanger and the gasified working medium is transferred to the compressor 12, so that a high-pressure superheated steam is supplied.

(c) The working medium that has exited from the compressor 12 is transferred to the condenser 13 and the working medium in a gaseous state is subjected to heat exchange with a fluid to be heated (air, water, etc.), so that the working medium is liquefied.

(d) The liquefied coolant is subjected to throttle expansion by the expansion valve 14, and a low-pressure wet steam is supplied, so that the coolant is recirculated to step (a).

A high-temperature heat pump system accommodating a coolant includes at least one evaporator 11, at least one compressor 12, at least one condenser 13, at least one expander 14, and at least one pipe used to transfer the coolant between these elements.

There is no specific limitation on the type of the compressor. Usable compressors include a single-stage or multi-stage centrifugal compressor, a rotary piston-type compressor, a rotary vane-type compressor, a scroll-type compressor, a screw-type compressor, and a piston-crank-type compressor.

By use of the heat transmission composition according to the present invention as the working medium of a steam compression cycle system, warm water of 60° C. or higher, preferably pressurized hot water or superheated steam of 80° C. or higher, and more preferably pressurized hot water or superheated steam of 110° C. or higher, may be generated.

EXAMPLES

Hereinafter, the present invention will be described in detail by way of examples. The present invention is not limited to any of the following examples.

The coefficient of performance (COP) is a generally recognized criterion for performance of a coolant, and is especially useful to represent a relative thermodynamic efficiency of a heat transmission composition in a specific heating or cooling cycle including evaporation or condensation of the heat transmission composition. The ratio of the amount of heat received by the coolant from a medium to be cooled in an evaporator, with respect to the work applied by a compressor for compression, is represented by $COP_R$. By contrast, the ratio of the amount of heat released by the heat transmission composition to a medium to be heated in a condenser, with respect to the work applied by the compressor for compressing the steam, is represented by $COP_H$.

The volume capacity of a heat transmission composition represents the amount of heat for cooling or heating that is given by the heat transmission composition per unit absorption volume of a compressor. Namely, as the volume capacity of the heat transmission composition is larger with respect to a specific compressor, the heat transmission composition absorbs or releases a larger amount of heat.

Example 1

<Mixed heat transmission composition of cis-1,3,3,3-tetrafluoropropene and 1,1,1,3,3-pentafluoropropane>

In a performance evaluation on a high-temperature heat pump cycle using a mixed heat transmission composition of cis-1,3,3,3-tetrafluoropropene and 1,1,1,3,3-pentafluoropropane, the coefficient of performance was calculated under the conditions shown in Table 1. Physical property values of the heat transmission composition were obtained from REFPROP ver. 9.0 of National Institute of Standards and Technology (NIST) of the United States.

Table 1 shows high-temperature heat pump cycle calculation conditions 1.

TABLE 1

| High-temperature heat pump cycle calculation conditions 1 | | |
| --- | --- | --- |
| Evaporation temperature | $T_{EVA}$ | 30 [° C.] |
| Condensation temperature | $T_{CON}$ | 90 [° C.] |
| Degree of superheat | $T_{sh}$ | 5 [K] |
| Degree of supercool | $T_{sc}$ | 10 [K] |
| Compressor efficiency | $\eta$ | 0.7 [—] |

The heat pump cycle conditions 1 are made with an assumption that hot water of 80° C. is generated by heat exchange between the heat transmission composition and heat source water in the condenser.

For calculating the high-temperature heat pump cycle performance ($COP_H$), the following conditions were assumed.

(A) The compression performed by the compressor is isentropic compression.

(B) The throttle expansion performed by the expansion valve is isenthalpic expansion.

(C) The heat loss and the pressure loss in the pipe and the heat exchanger are ignored.

(D) The compressor efficiency η is 0.7.

Hereinafter, equations used to calculate the high-temperature heat pump cycle performance ($COP_H$) will be described in detail. The input heat amount $Q_{EVA}$ to the evaporator is:

$$Q_{EVA}=G\times(h_1-h_4) \quad (1)$$

The released heat amount $Q_{CON}$ from the condenser is:

$$Q_{CON}=G\times(h_2-h_3) \quad (2)$$

It should be noted that where the enthalpy of the heat transmission composition at the outlet of the compressor after the isentropic compression is represented by $h_{2th}$, enthalpy $h_2$ of the heat transmission composition at the outlet of the compressor calculated in consideration of the compressor efficiency is:

$$h_2=h_1+(h_{2th}-h_1)/\eta \quad (3)$$

Work W given by the compressor for compressing the heat transmission composition steam is:

$$W=G\times(h_2-h_1) \quad (4)$$

The coefficient of performance ($COP_H$) of the high-temperature heat pump cycle is:

$$COP_H=Q_{CON}/W=(h_2-h_3)/(h_2-h_1) \quad (5)$$

Now, an equation used to calculate the volume capacity (CAP) of the heat transmission medium will be described in detail. The steam density of the heat transmission medium at the absorption inlet of the compressor is $\rho_2$, and the released heat amount from the condenser is $Q_{CON}$.

Therefore, $$CAP=\rho_2\times Q_{CON}=\rho_2\times G\times(h_2-h_3) \quad (6)$$

Figure 2:
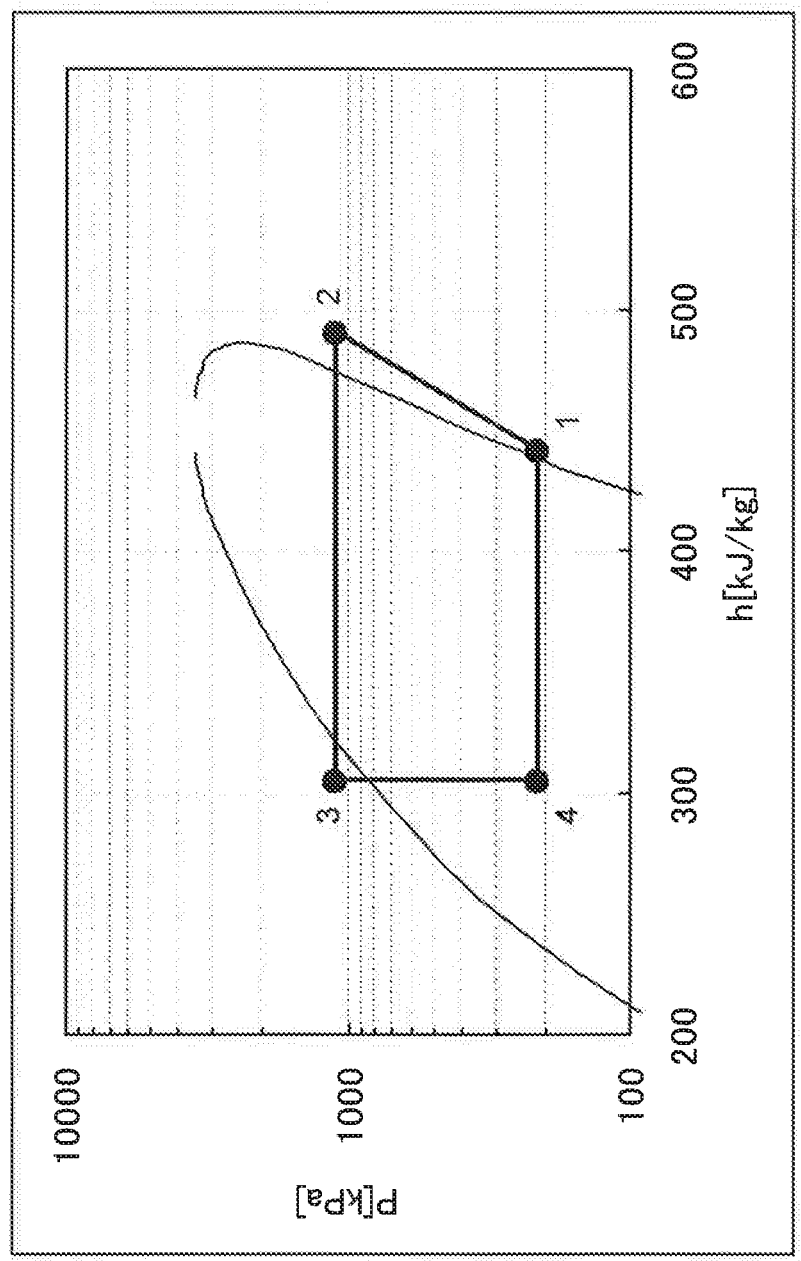
FIG. 2 is a P-h diagram in example 1 according to the present invention.

In (1) through (6) above, the symbols represent the following:

G: Amount of circulating heat transmission composition
W: Compression work
$Q_{EVA}$: Input heat amount
$Q_{CON}$: Released heat amount
$COP_H$: Coefficient of performance (heating)
CAP: Volume capacity (heating)
h: Specific enthalpy
$_{1,2,3,4}$: Cycle point
$_{2th}$: Cycle point after isentropic compression FIG. 2 is a P-h diagram in example 1 (the mass ratio of cis-1,3,3,3-tetrafluoropropene:1,1,1,3,3-pentafluoropropane is 95:5). In the figure, cycle points 1, 2, 3 and 4 represent the high-temperature heat pump cycle calculation conditions 1.

Example 2

<Mixed heat transmission composition of cis-1,3,3,3-tetrafluoropropene trans-1-chloro-3,3,3-trifluoropropene>

Figure 3:
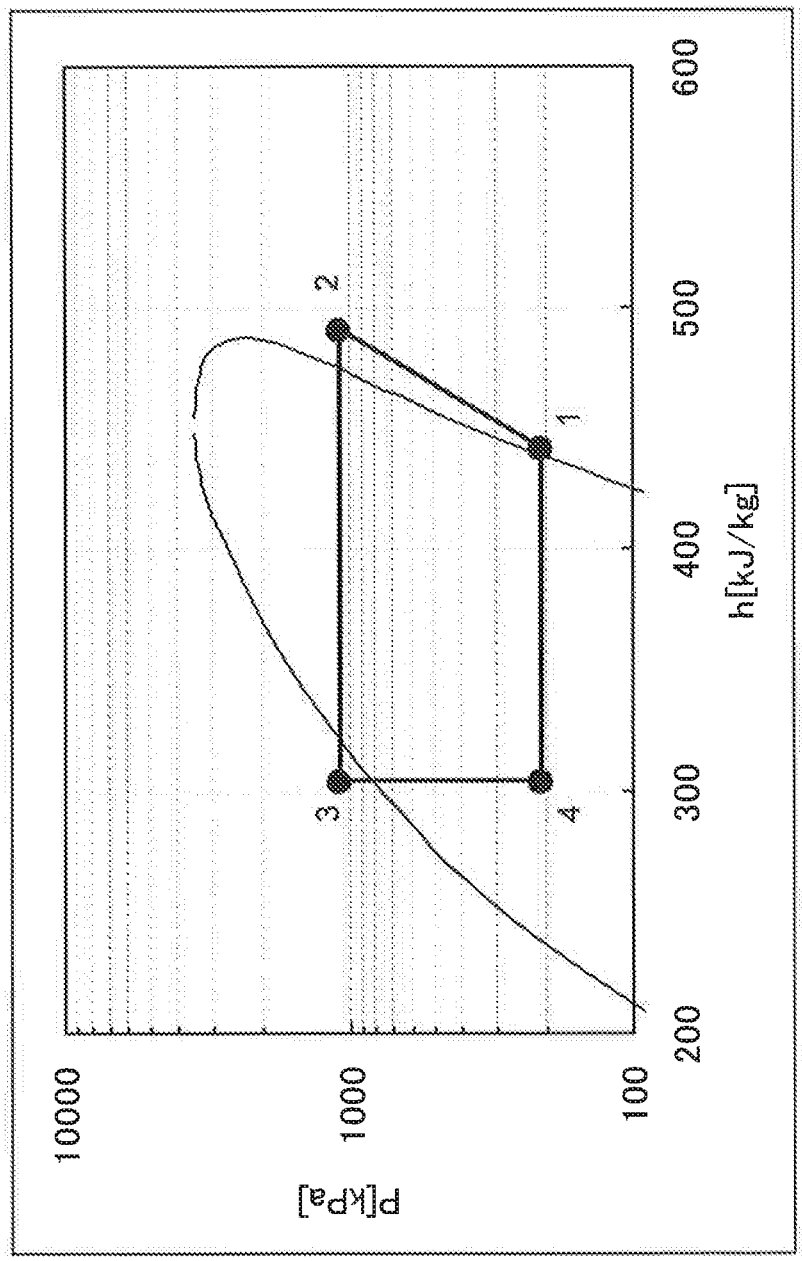
FIG. 3 is a P-h diagram in example 2 according to the present invention.

In a performance evaluation on a high-temperature heat pump cycle using a mixed heat transmission composition of cis-1,3,3,3-tetrafluoropropene and trans-1-chloro-3,3,3-trifluoropropene, the coefficient of performance was calculated under the conditions shown in Table 1. FIG. 3 is a P-h diagram in example 2 (the mass ratio of cis-1,3,3,3-tetrafluoropropene trans-1-chloro-3,3,3-trifluoropropene is 95:5).

Example 3

<Mixed heat transmission composition of cis-1,3,3,3-tetrafluoropropene and 1,1,1,3,3-pentafluoropropane>

Figure 4:
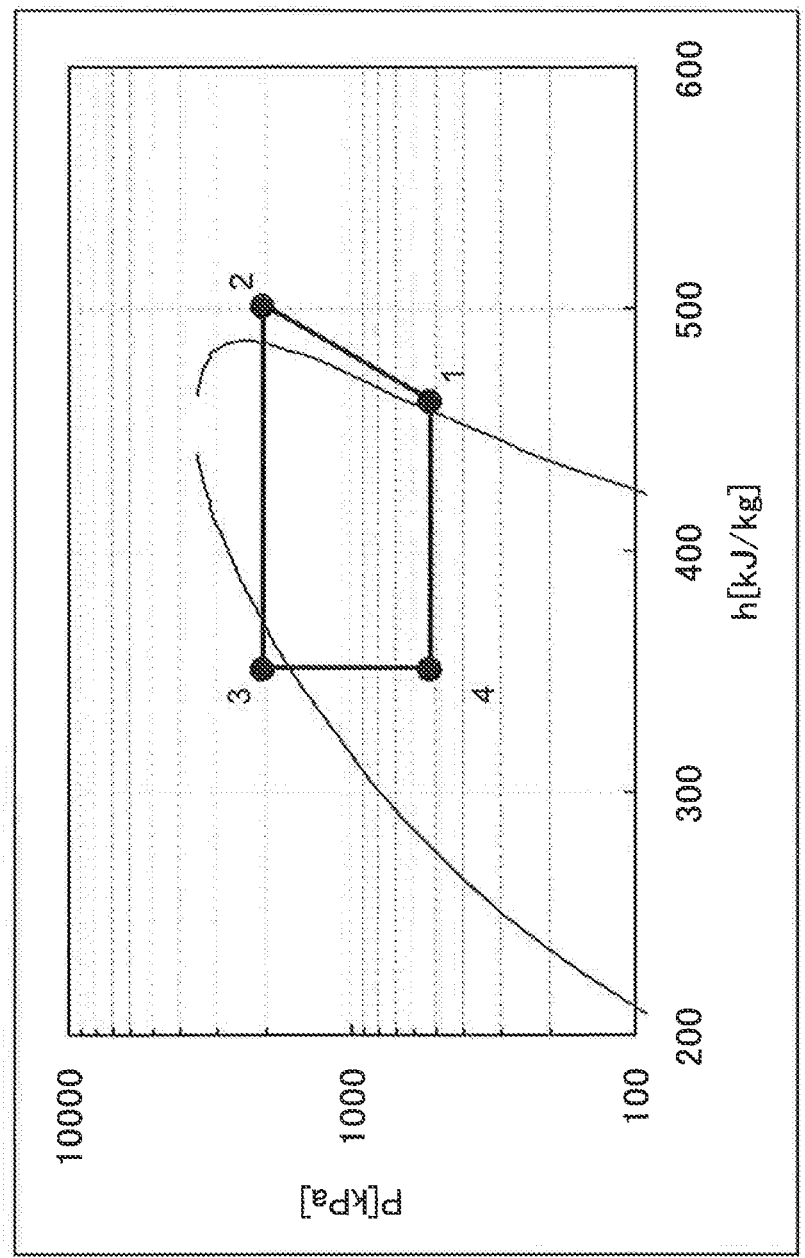
FIG. 4 is a P-h diagram in example 3 according to the present invention.

In a performance evaluation on the high-temperature heat pump cycle using the mixed heat transmission composition of cis-1,3,3,3-tetrafluoropropene and 1,1,1,3,3-pentafluoropropane, the coefficient of performance was calculated under the conditions shown in Table 2. FIG. 4 is a P-h diagram in example 3 (the mass ratio of cis-1,3,3,3-tetrafluoropropene:1,1,1,3,3-pentafluoropropane is 95:5).

Table 2 shows high-temperature heat pump cycle calculation conditions 2.

TABLE 2

| High-temperature heat pump cycle calculation conditions 2 | | |
| --- | --- | --- |
| Evaporation temperature | $T_{EVA}$ | 60 [° C.] |
| Condensation temperature | $T_{CON}$ | 120 [° C.] |
| Degree of superheat | $T_{sh}$ | 5 [K] |
| Degree of supercool | $T_{sc}$ | 10 [K] |
| Compressor efficiency | $\eta$ | 0.7 [—] |

The heat pump cycle conditions 2 are made with an assumption that pressurized hot water of 110° C. is generated by heat exchange between the heat transmission composition and heat source water in the condenser.

Example 4

<Mixed heat transmission composition of cis-1,3,3,3-tetrafluoropropene and trans-1-chloro-3,3,3-trifluoropropene>

Figure 5:
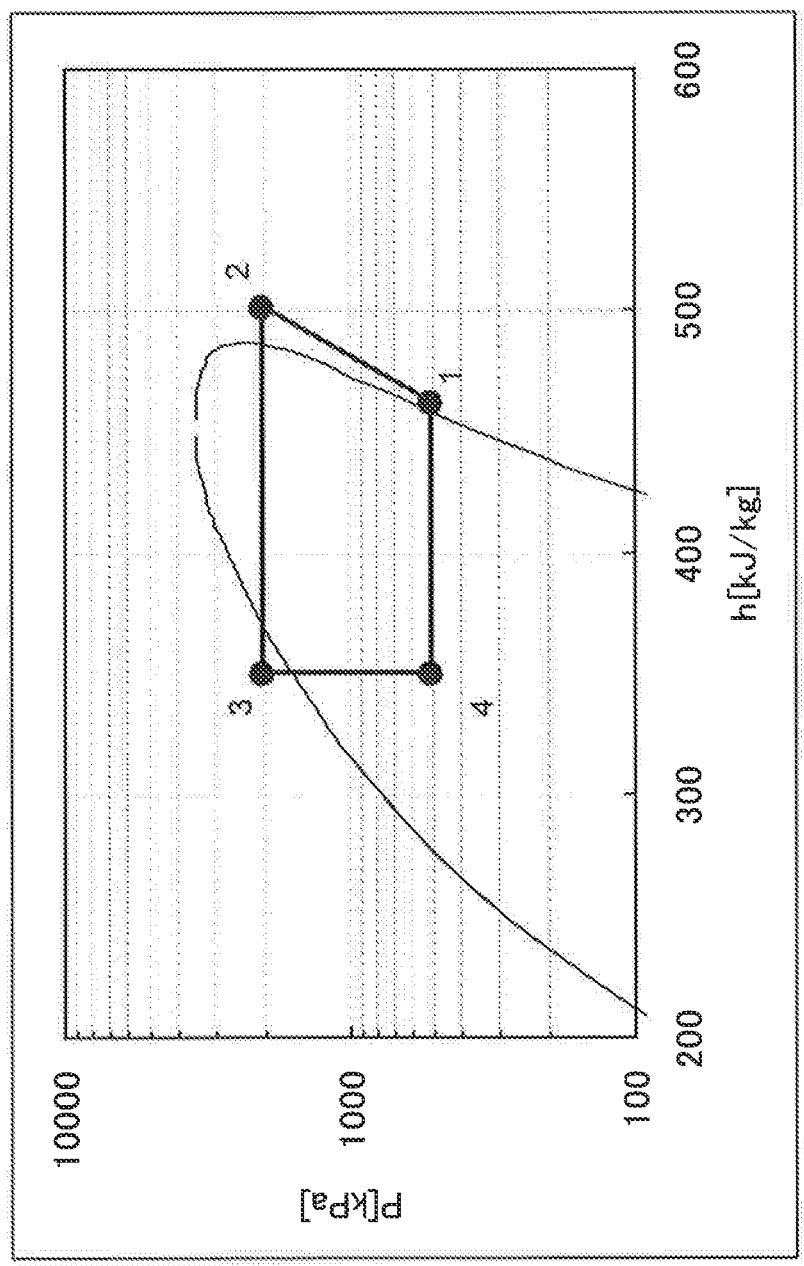
FIG. 5 is a P-h diagram in example 4 according to the present invention.

In a performance evaluation on the high-temperature heat pump cycle using the mixed heat transmission composition of cis-1,3,3,3-tetrafluoropropene and trans-1-chloro-3,3,3-trifluoropropene, the coefficient of performance was calculated under the conditions shown in Table 2. FIG. 5 is a P-h diagram in example 4 (the mass ratio of cis-1,3,3,3-tetrafluoropropene trans-1-chloro-3,3,3-trifluoropropene is 95:5).

Example 5

<Mixed heat transmission composition of cis-1,3,3,3-tetrafluoropropene and 1,1,1,3,3-pentafluoropropane>

Figure 6:
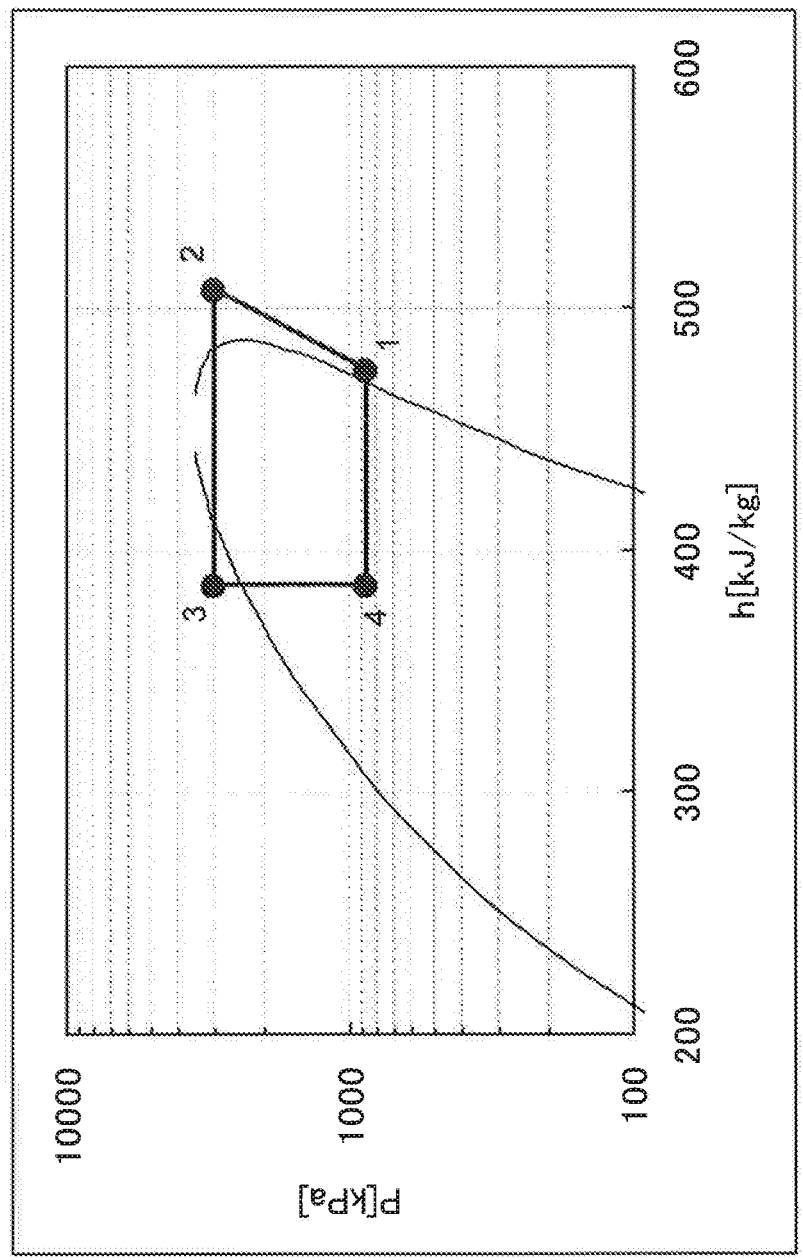
FIG. 6 is a P-h diagram in example 5 according to the present invention.

In a performance evaluation on the high-temperature heat pump cycle using the mixed heat transmission composition of cis-1,3,3,3-tetrafluoropropene and 1,1,1,3,3-pentafluoropropane, the coefficient of performance was calculated under the conditions shown in Table 3. FIG. 6 is a P-h diagram in example 3 (the mass ratio of cis-1,3,3,3-tetrafluoropropene:1,1,1,3,3-pentafluoropropane is 95:5).

Table 3 shows high-temperature heat pump cycle calculation conditions 3.

TABLE 3

| High-temperature heat pump cycle calculation conditions 3 | | |
|---|---|---|
| Evaporation temperature | $T_{EVA}$ | 80 [° C.] |
| Condensation temperature | $T_{CON}$ | 140 [° C.] |
| Degree of superheat | $T_{sh}$ | 5 [K] |
| Degree of supercool | $T_{sc}$ | 10 [K] |
| Compressor efficiency | $\eta$ | 0.7 [—] |

The heat pump cycle conditions 3 are made with an assumption that pressurized hot water of 130° C. is generated by heat exchange between the heat transmission composition and heat source water in the condenser.

Example 6

<Mixed heat transmission composition of cis-1,3,3,3-tetrafluoropropene and trans-1-chloro-3,3,3-trifluoropropene>

Figure 7:
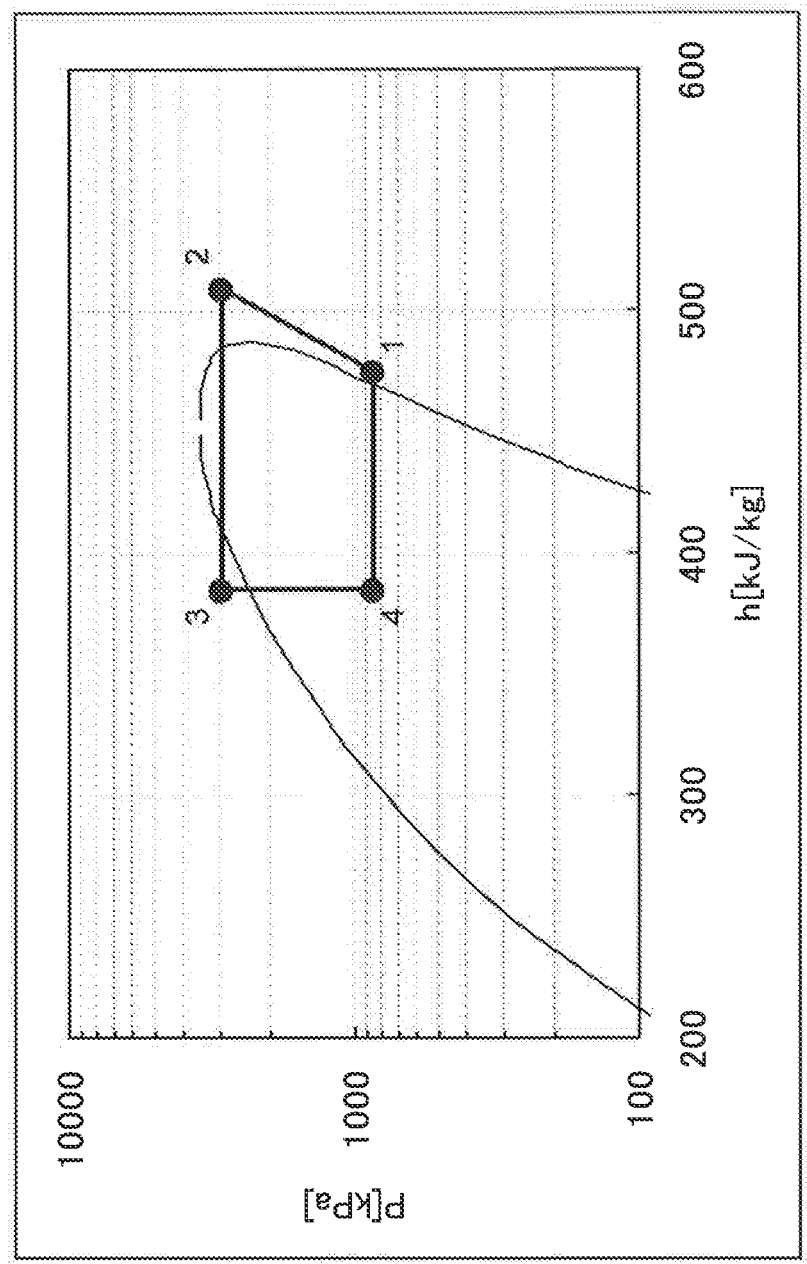
FIG. 7 is a P-h diagram in example 6 according to the present invention.

In a performance evaluation on the high-temperature heat pump cycle using the mixed heat transmission composition of cis-1,3,3,3-tetrafluoropropene and trans-1-chloro-3,3,3-trifluoropropene, the coefficient of performance was calculated under the conditions shown in Table 3. FIG. 7 is a P-h diagram in example 6 (the mass ratio of cis-1,3,3,3-tetrafluoropropene trans-1-chloro-3,3,3-trifluoropropene is 95:5).

Example 7

<Mixed heat transmission composition of cis-1,3,3,3-tetrafluoropropene and trans-1,3,3,3-tetrafluoropropene>

Figure 8:
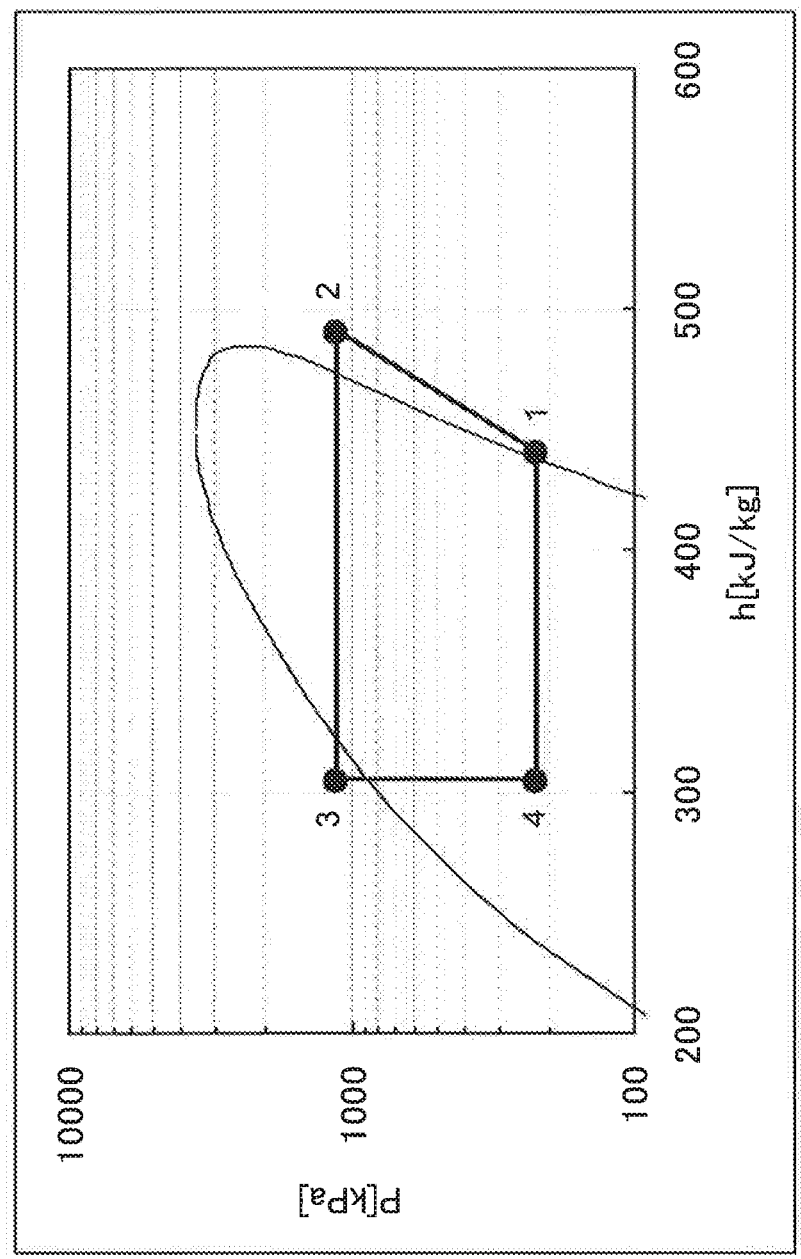
FIG. 8 is a P-h diagram in example 7 according to the present invention.

In a performance evaluation on a high-temperature heat pump cycle using a mixed heat transmission composition of cis-1,3,3,3-tetrafluoropropene and trans-1,3,3,3-tetrafluoropropene, the coefficient of performance was calculated under the conditions shown in Table 1. FIG. 8 is a P-h diagram in example 7 (the mass ratio of cis-1,3,3,3-tetrafluoropropene trans-1,3,3,3-tetrafluoropropene is 95:5).

Example 8

<Mixed heat transmission composition of cis-1,3,3,3-tetrafluoropropene and trans-1,3,3,3-tetrafluoropropene>

Figure 9:
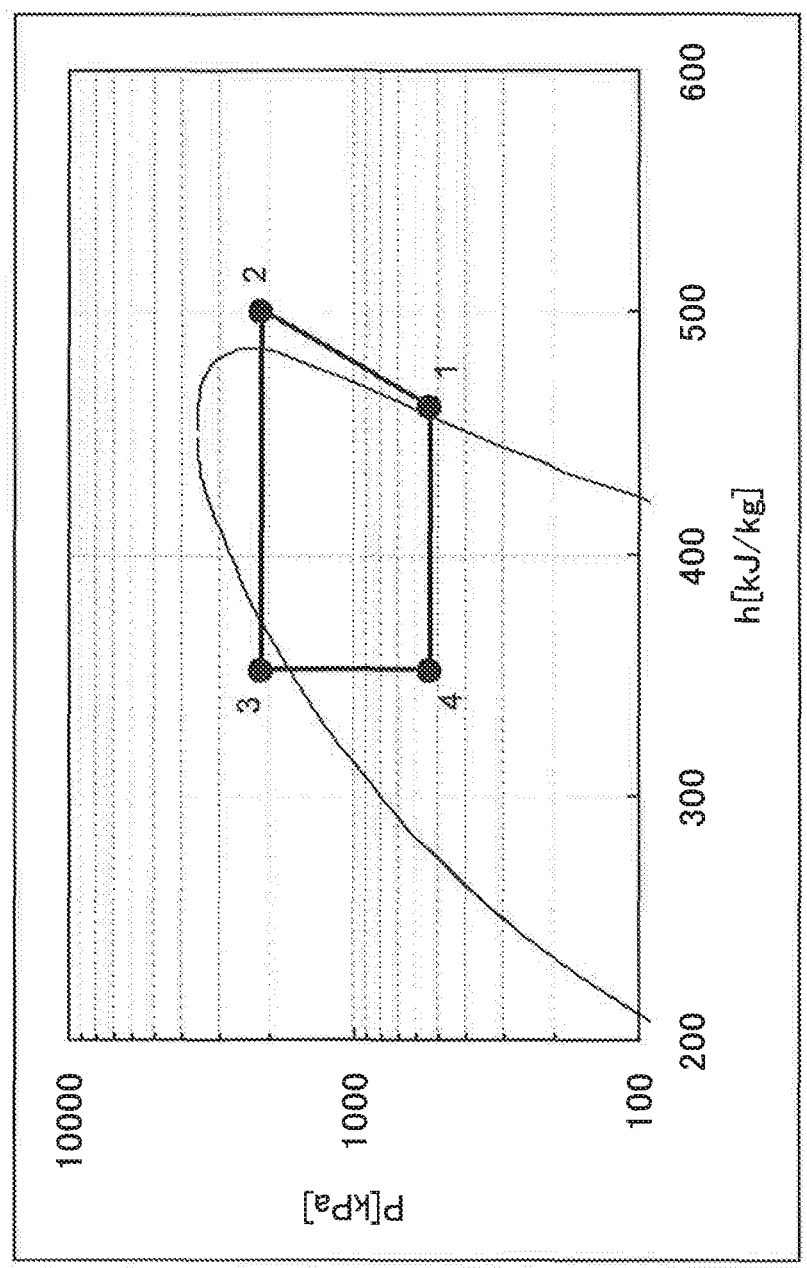
FIG. 9 is a P-h diagram in example 8 according to the present invention.

In a performance evaluation on the high-temperature heat pump cycle using the mixed heat transmission composition of cis-1,3,3,3-tetrafluoropropene and trans-1,3,3,3-tetrafluoropropene, the coefficient of performance was calculated under the conditions shown in Table 2. FIG. 9 is a P-h diagram in example 8 (the mass ratio of cis-1,3,3,3-tetrafluoropropene trans-1,3,3,3-tetrafluoropropene is 95:5).

Example 9

<Mixed heat transmission composition of cis-1,3,3,3-tetrafluoropropene and trans-1,3,3,3-tetrafluoropropene>

Figure 10:
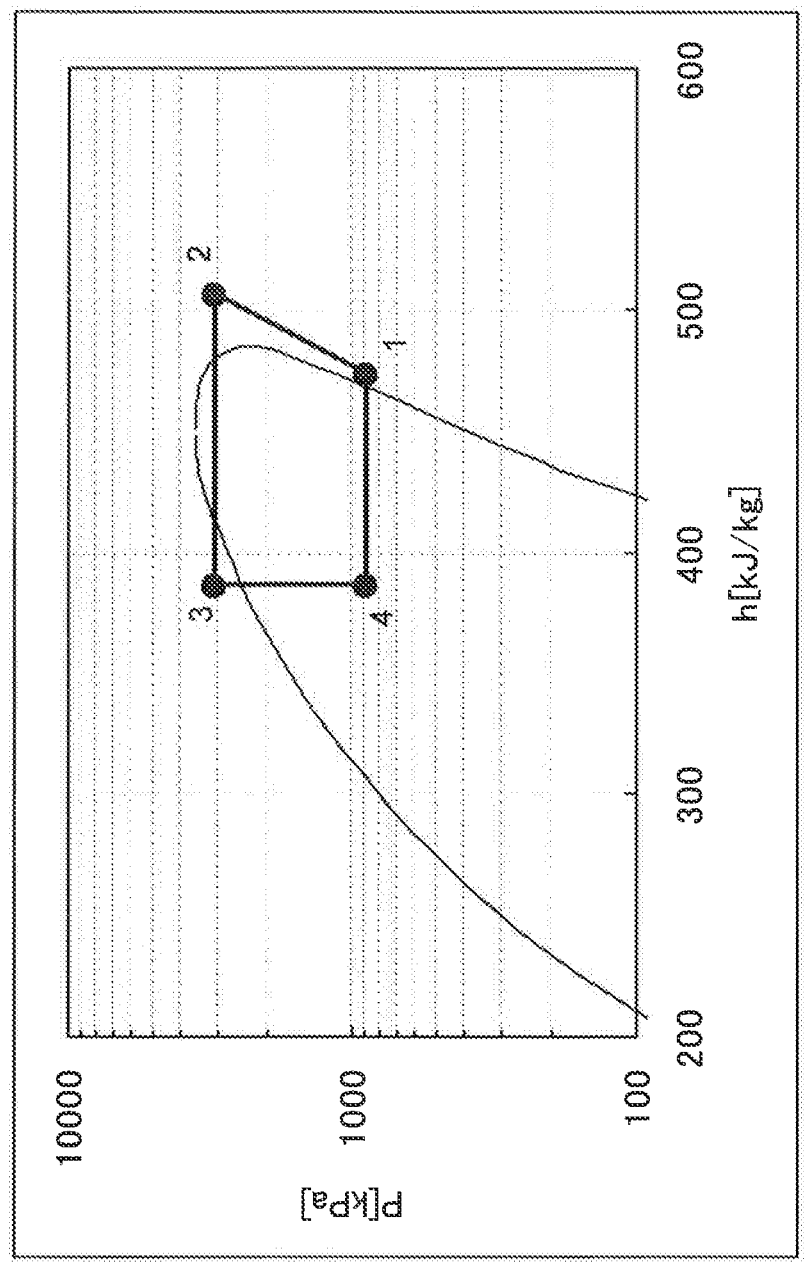
FIG. 10 is a P-h diagram in example 9 according to the present invention.

In a performance evaluation on the high-temperature heat pump cycle using the mixed heat transmission composition of cis-1,3,3,3-tetrafluoropropene and trans-1,3,3,3-tetrafluoropropene, the coefficient of performance was calculated under the conditions shown in Table 3. FIG. 10 is a P-h diagram in example 9 (the mass ratio of cis-1,3,3,3-tetrafluoropropene trans-1,3,3,3-tetrafluoropropene is 95:5).

Example 10

<Mixed heat transmission composition of cis-1,3,3,3-tetrafluoropropene and 2,3,3,3-tetrafluoropropene>

Figure 11:
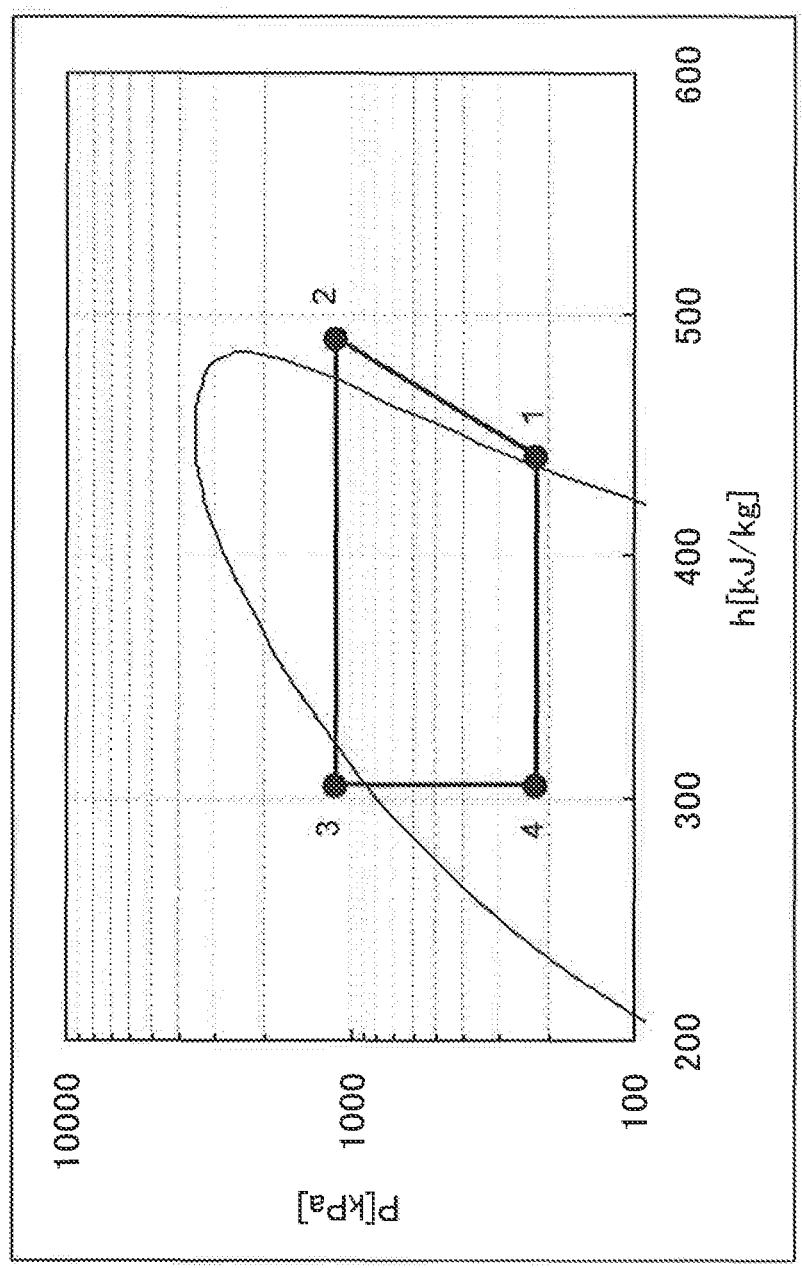
FIG. 11 is a P-h diagram in example 10 according to the present invention.

In a performance evaluation on a high-temperature heat pump cycle using a mixed heat transmission composition of cis-1,3,3,3-tetrafluoropropene and 2,3,3,3-tetrafluoropropene, the coefficient of performance was calculated under the conditions shown in Table 1. FIG. 11 is a P-h diagram in example 10 (the mass ratio of cis-1,3,3,3-tetrafluoropropene:2,3,3,3-tetrafluoropropene is 95:5).

Example 11

<Mixed heat transmission composition of cis-1,3,3,3-tetrafluoropropene and 2,3,3,3-tetrafluoropropene>

Figure 12:
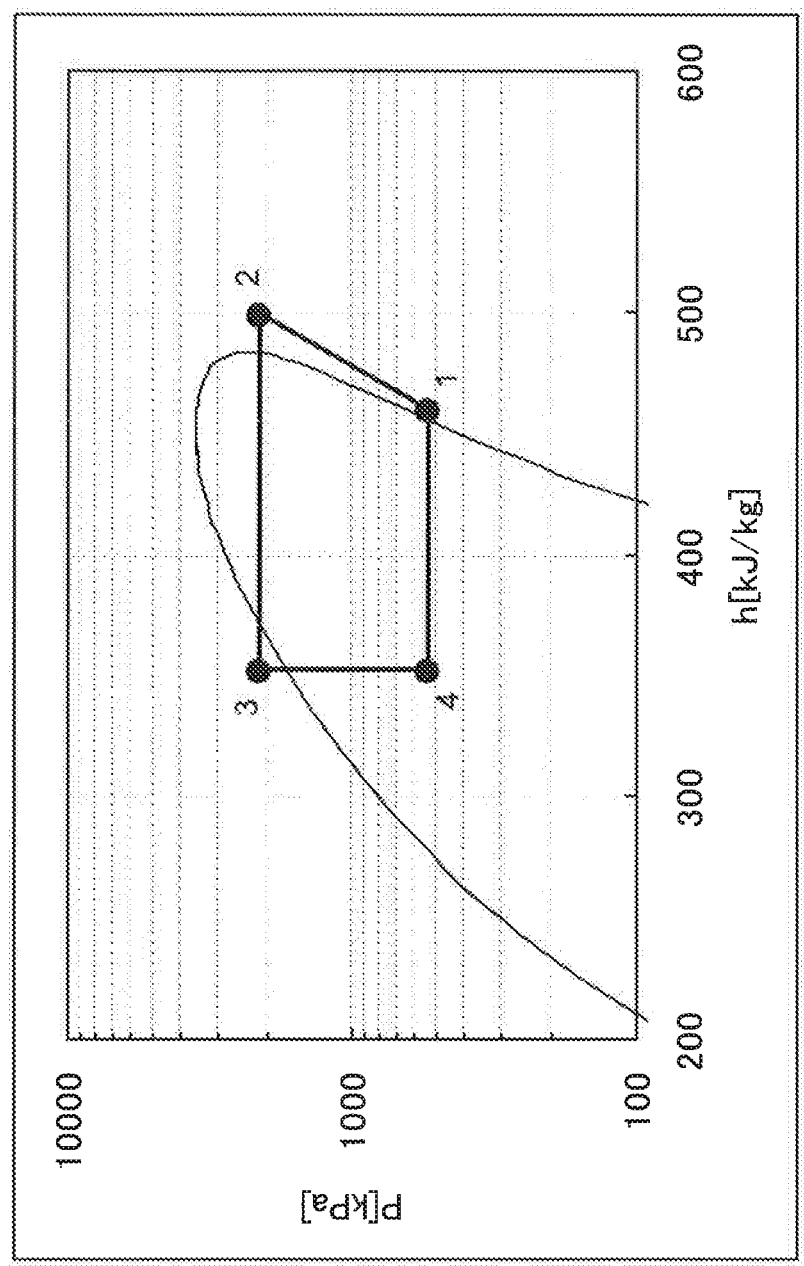
FIG. 12 is a P-h diagram in example 11 according to the present invention.

In a performance evaluation on the high-temperature heat pump cycle using the mixed heat transmission composition of cis-1,3,3,3-tetrafluoropropene and 2,3,3,3-tetrafluoropropene, the coefficient of performance was calculated under the conditions shown in Table 2. FIG. 12 is a P-h diagram in example 11 (the mass ratio of cis-1,3,3,3-tetrafluoropropene:2,3,3,3-tetrafluoropropene is 95:5).

Example 12

<Mixed heat transmission composition of cis-1,3,3,3-tetrafluoropropene and 2,3,3,3-tetrafluoropropene>

Figure 13:
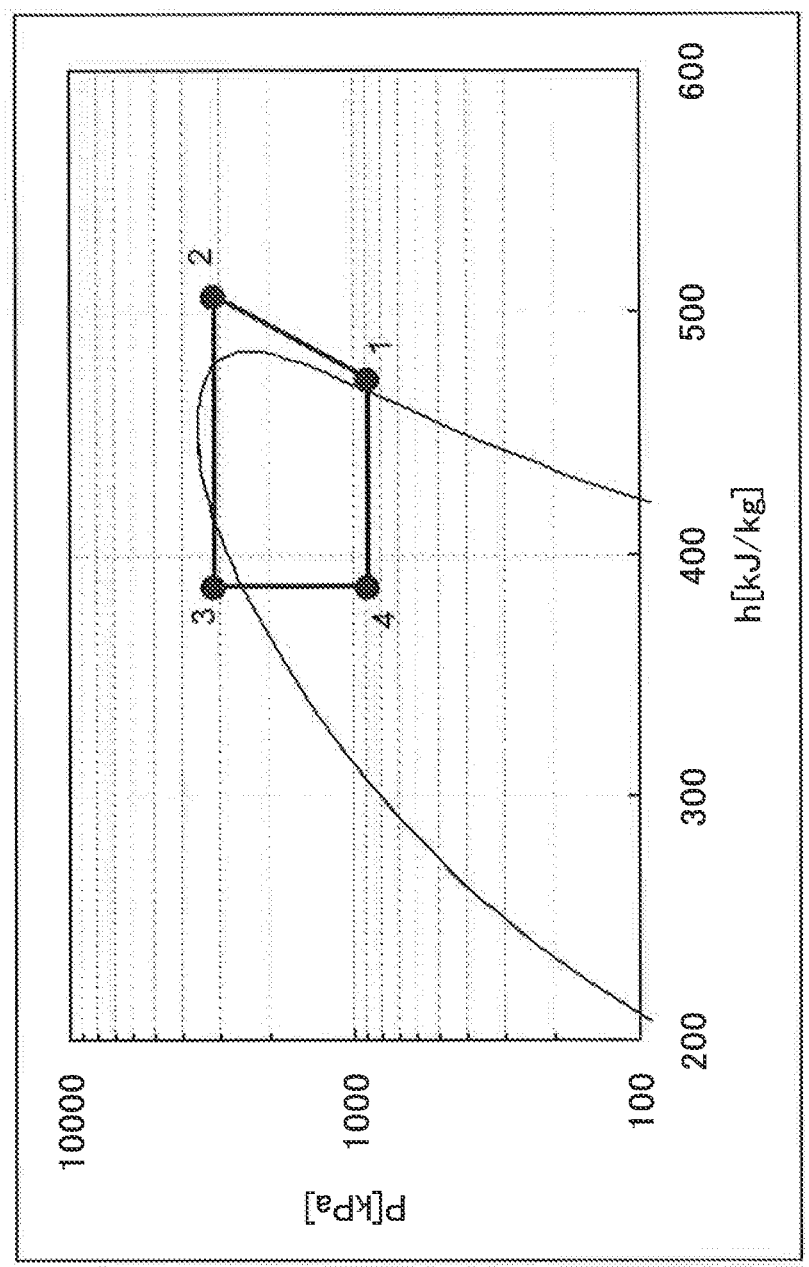
FIG. 13 is a P-h diagram in example 12 according to the present invention.

In a performance evaluation on the high-temperature heat pump cycle using the mixed heat transmission composition of cis-1,3,3,3-tetrafluoropropene and 2,3,3,3-tetrafluoropropene, the coefficient of performance was calculated under the conditions shown in Table 3. FIG. 13 is a P-h diagram in example 12 (the mass ratio of cis-1,3,3,3-tetrafluoropropene:2,3,3,3-tetrafluoropropene is 95:5).

Comparative Example 1

<1,1,1,3,3-pentafluoropropane and 1,1,1,3,3-pentafluorobutane>

Figure 14:
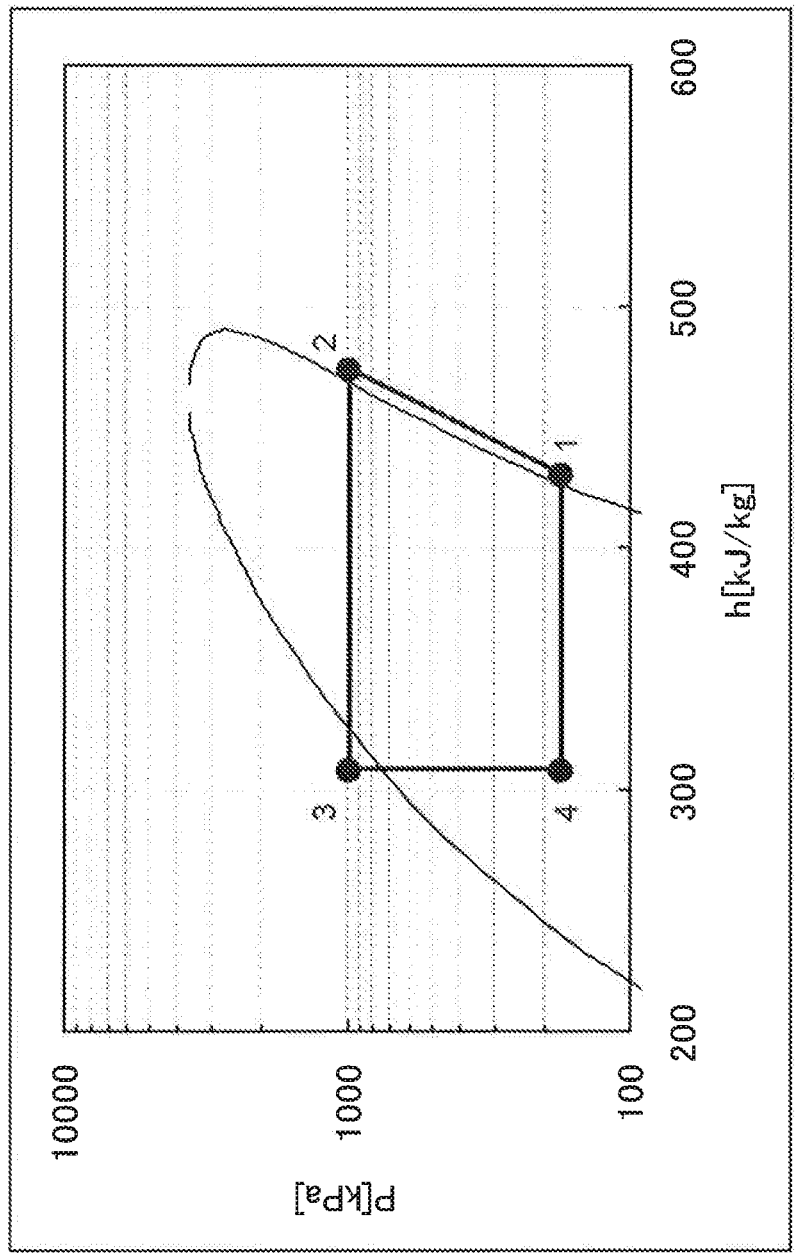
FIG. 14 is a P-h diagram in comparative example 1 provided as a comparison to the present invention.

In a performance evaluation on a high-temperature heat pump cycle using a mixed heat transmission composition of 1,1,1,3,3-pentafluoropropane and 1,1,1,3,3-pentafluorobutane instead of the heat transmission composition according to the present invention, the coefficient of performance was calculated under the conditions shown in Table 1. FIG. 14 is a P-h diagram in comparative example 1 (the mass ratio of 1,1,1,3,3-pentafluoropropane 1,1,1,3,3-pentafluorobutane is 95:5).

<1,1,1,3,3-pentafluorobutane (HFC-365mfc)>

HFC-365mfc is flammable and has a low level of toxicity. HFC-365mfc has a boiling point of 40.2° C. at an atmospheric pressure, an atmospheric lifetime of 8.6 years, and a global warming potential (GWP) of 794 (IPCC 4th Assessment Report, 2007).

Comparative Example 2

<1,1,1,3,3-pentafluoropropane and 1,1,1,3,3-pentafluorobutane>

Figure 15:
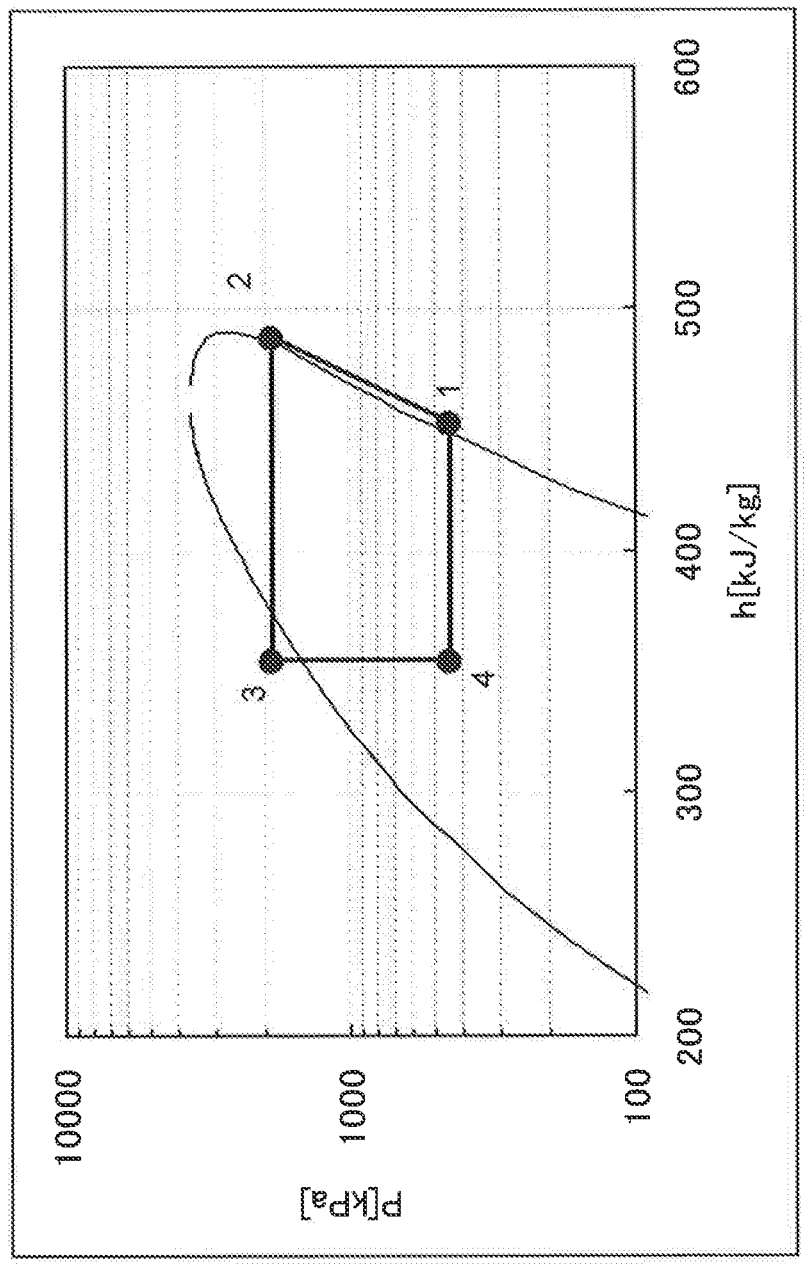
FIG. 15 is a P-h diagram in comparative example 2 provided as a comparison the present invention.

In a performance evaluation on the high-temperature heat pump cycle using the mixed heat transmission composition of 1,1,1,3,3-pentafluoropropane and 1,1,1,3,3-pentafluorobutane instead of the heat transmission composition according to the present invention, the coefficient of performance was calculated under the conditions shown in Table 2. FIG. 15 is a P-h diagram in comparative example 2 (the mass ratio of 1,1,1,3,3-pentafluoropropane 1,1,1,3,3-pentafluorobutane is 95:5).

Comparative Example 3

<1,1,1,3,3-pentafluoropropane and 1,1,1,3,3-pentafluorobutane>

Figure 16:
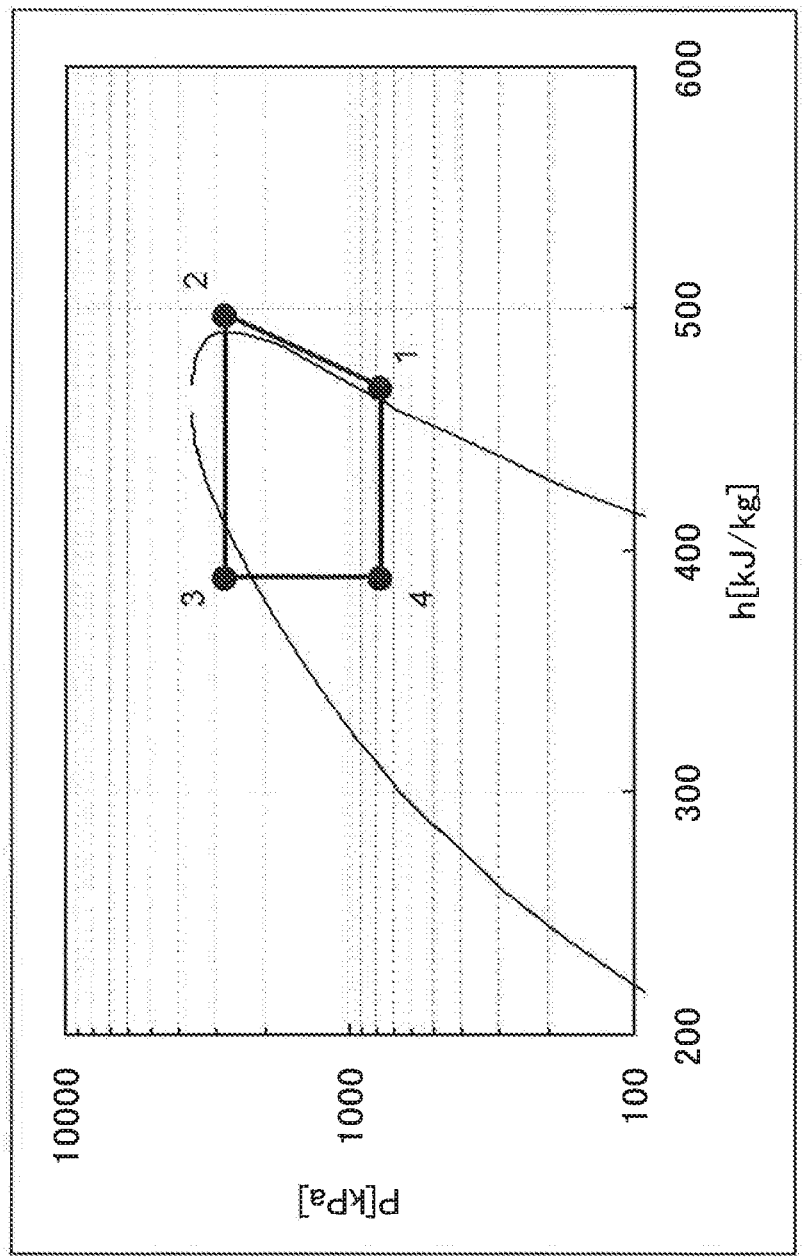
FIG. 16 is a P-h diagram in comparative example 3 provided as a comparison the present invention.

In a performance evaluation on the high-temperature heat pump cycle using the mixed heat transmission composition of 1,1,1,3,3-pentafluoropropane and 1,1,1,3,3-pentafluorobutane instead of the heat transmission composition according to the present invention, the coefficient of performance was calculated under the conditions shown in Table 3. FIG. 16 is a P-h diagram in comparative example 3 (the mass ratio of 1,1,1,3,3-pentafluoropropane 1,1,1,3,3-pentafluorobutane is 95:5).

The calculation results of the high-temperature heat pump cycle performance ($COP_H$) in examples 1 through 12 and comparative examples 1 through 3 are shown in Tables 4 through 18.

In examples 1 through 12 and comparative examples 1 through 3, values of a first component and a second component of each heat transmission composition are shown by percent by mass. In examples 1, 3 and 5, the first component of the mixed heat transmission composition is cis-1,3,3,3-tetrafluoropropene, and the second component thereof is 1,1,1,3,3-pentafluoropropane.

In examples 2, 4 and 6, the first component of the mixed heat transmission composition is cis-1,3,3,3-tetrafluoropropene, and the second component thereof is trans-1-chloro-3,3,3-trifluoropropene.

In examples 7 through 9, the first component of the mixed heat transmission composition is cis-1,3,3,3-tetrafluoropropene, and the second component thereof is trans-1,3,3,3-tetrafluoropropene.

In examples 10 through 12, the first component of the mixed heat transmission composition is cis-1,3,3,3-tetrafluoropropene, and the second component thereof is 2,3,3,3-tetrafluoropropene.

In comparative examples 1, 2 and 3, the first component of the mixed heat transmission composition is 1,1,1,3,3-pentafluoropropane, and the second component thereof is 1,1,1,3,3-pentafluorobutane.

In Tables 4, 5, 10 and 13 regarding examples 1, 2, 7 and 10, the relative COP values and the relative CAP values were respectively calculated, with the COP values and the CAP values at the corresponding component ratios of the mixed heat transmission composition of comparative example 1 shown in Table 16 being 1.00. Similarly, in Tables 6, 7, 11 and 14 regarding examples 3, 4, 8 and 11, the relative COP values and the relative CAP values were respectively calculated, with the COP values and the CAP values at the corresponding component ratios of the mixed heat transmission composition of comparative example 2 shown in Table 17 being 1.00. In Tables 8, 9, 12 and 15 regarding examples 5, 6, 9 and 12, the relative COP values and the relative CAP values were respectively calculated, with the COP values and the CAP values at the corresponding component ratios of the mixed heat transmission composition of comparative example 3 shown in Table 18 being 1.00.

TABLE 4

| 1st compo-nent | 2nd compo-nent | GWP | $T_2$ [° C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 106 | 103.5 | 213 | 1100 | 5.16 | 1.02 | 1.25 |
| 92 | 8 | 85 | 103.7 | 212 | 1097 | 5.16 | 1.02 | 1.23 |
| 95 | 5 | 54 | 104.0 | 212 | 1092 | 5.16 | 1.02 | 1.20 |
| 97 | 3 | 34 | 104.2 | 211 | 1088 | 5.16 | 1.02 | 1.18 |
| 98 | 2 | 24 | 104.3 | 211 | 1087 | 5.16 | 1.02 | 1.17 |
| 99 | 1 | 13 | 104.4 | 210 | 1085 | 5.15 | 1.02 | 1.16 |

TABLE 5

| 1st compo-nent | 2nd compo-nent | GWP | $T_2$ [° C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 3.4 | 104.1 | 207 | 1066 | 5.16 | 1.03 | 1.22 |
| 92 | 8 | 3.3 | 104.2 | 207 | 1070 | 5.16 | 1.02 | 1.21 |
| 95 | 5 | 3.2 | 104.3 | 208 | 1075 | 5.16 | 1.02 | 1.18 |
| 97 | 3 | 3.1 | 104.4 | 209 | 1078 | 5.16 | 1.02 | 1.17 |
| 98 | 2 | 3.1 | 104.4 | 209 | 1080 | 5.16 | 1.02 | 1.16 |
| 99 | 1 | 3.0 | 104.4 | 210 | 1082 | 5.15 | 1.02 | 1.16 |

TABLE 6

| 1st compo-nent | 2nd compo-nent | GWP | $T_2$ [° C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 106 | 129.6 | 524 | 2059 | 3.93 | 1.02 | 1.19 |
| 92 | 8 | 85 | 129.8 | 523 | 2053 | 3.93 | 1.02 | 1.17 |
| 95 | 5 | 54 | 130.0 | 521 | 2043 | 3.92 | 1.02 | 1.14 |
| 97 | 3 | 34 | 130.1 | 519 | 2037 | 3.92 | 1.02 | 1.13 |
| 98 | 2 | 24 | 130.2 | 518 | 2033 | 3.92 | 1.02 | 1.12 |
| 99 | 1 | 13 | 130.3 | 518 | 2030 | 3.92 | 1.02 | 1.11 |

TABLE 7

| 1st compo-nent | 2nd compo-nent | GWP | $T_2$ [° C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 3.4 | 130.0 | 508 | 1996 | 3.93 | 1.03 | 1.16 |
| 92 | 8 | 3.3 | 130.1 | 510 | 2003 | 3.93 | 1.03 | 1.15 |
| 95 | 5 | 3.2 | 130.2 | 513 | 2012 | 3.92 | 1.03 | 1.13 |
| 97 | 3 | 3.1 | 130.2 | 514 | 2018 | 3.92 | 1.02 | 1.12 |
| 98 | 2 | 3.1 | 130.3 | 515 | 2021 | 3.92 | 1.02 | 1.12 |
| 99 | 1 | 3.0 | 130.3 | 516 | 2024 | 3.92 | 1.02 | 1.11 |

TABLE 8

| 1st component | 2nd component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 106 | 150.0 | 872 | 2992 | 3.43 | 1.01 | 1.15 |
| 92 | 8 | 85 | 150.1 | 869 | 2983 | 3.43 | 1.01 | 1.14 |
| 95 | 5 | 54 | 150.2 | 866 | 2969 | 3.43 | 1.02 | 1.12 |
| 97 | 3 | 34 | 150.3 | 863 | 2959 | 3.43 | 1.02 | 1.11 |
| 98 | 2 | 24 | 150.4 | 862 | 2954 | 3.43 | 1.02 | 1.10 |
| 99 | 1 | 13 | 150.4 | 860 | 2949 | 3.43 | 1.02 | 1.09 |

TABLE 9

| 1st component | 2nd component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 3.4 | 150.2 | 845 | 2900 | 3.43 | 1.03 | 1.14 |
| 92 | 8 | 3.3 | 150.3 | 848 | 2909 | 3.43 | 1.03 | 1.13 |
| 95 | 5 | 3.2 | 150.3 | 852 | 2922 | 3.43 | 1.02 | 1.11 |
| 97 | 3 | 3.1 | 150.4 | 855 | 2931 | 3.43 | 1.02 | 1.10 |
| 98 | 2 | 3.1 | 150.4 | 856 | 2935 | 3.43 | 1.02 | 1.10 |
| 99 | 1 | 3.0 | 150.4 | 857 | 2939 | 3.43 | 1.02 | 1.09 |

TABLE 10

| 1st component | 2nd component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 3.3 | 104.3 | 227 | 1167 | 5.14 | 1.00 | 1.31 |
| 92 | 8 | 3.2 | 104.3 | 224 | 1150 | 5.14 | 1.01 | 1.27 |
| 95 | 5 | 3.2 | 104.4 | 218 | 1124 | 5.15 | 1.01 | 1.22 |
| 97 | 3 | 3.1 | 104.4 | 215 | 1107 | 5.15 | 1.01 | 1.19 |
| 98 | 2 | 3.1 | 104.4 | 213 | 1099 | 5.15 | 1.02 | 1.18 |
| 99 | 1 | 3.0 | 104.5 | 212 | 1091 | 5.15 | 1.02 | 1.17 |

TABLE 11

| 1st component | 2nd component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 3.3 | 130.7 | 557 | 2188 | 3.92 | 0.99 | 1.23 |
| 92 | 8 | 3.2 | 130.6 | 549 | 2154 | 3.92 | 1.00 | 1.20 |
| 95 | 5 | 3.2 | 130.5 | 536 | 2105 | 3.92 | 1.01 | 1.16 |
| 97 | 3 | 3.1 | 130.4 | 528 | 2073 | 3.92 | 1.01 | 1.14 |
| 98 | 2 | 3.1 | 130.4 | 524 | 2057 | 3.92 | 1.02 | 1.13 |
| 99 | 1 | 3.0 | 130.4 | 521 | 2042 | 3.92 | 1.02 | 1.12 |

TABLE 12

| 1st component | 2nd component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 3.3 | 151.4 | 926 | 3196 | 3.45 | 0.97 | 1.18 |
| 92 | 8 | 3.2 | 151.2 | 912 | 3143 | 3.45 | 0.98 | 1.16 |
| 95 | 5 | 3.2 | 150.9 | 891 | 3066 | 3.44 | 1.00 | 1.13 |
| 97 | 3 | 3.1 | 150.7 | 878 | 3016 | 3.43 | 1.01 | 1.11 |
| 98 | 2 | 3.1 | 150.6 | 871 | 2991 | 3.43 | 1.01 | 1.10 |
| 99 | 1 | 3.0 | 150.5 | 865 | 2967 | 3.43 | 1.02 | 1.10 |

TABLE 13

| 1st component | 2nd component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 3.1 | 104.2 | 229 | 1176 | 5.14 | 0.99 | 1.31 |
| 92 | 8 | 3.1 | 104.2 | 225 | 1157 | 5.14 | 1.00 | 1.27 |
| 95 | 5 | 3.1 | 104.3 | 219 | 1128 | 5.15 | 1.01 | 1.22 |
| 97 | 3 | 3.0 | 104.4 | 216 | 1110 | 5.15 | 1.01 | 1.19 |
| 98 | 2 | 3.0 | 104.4 | 214 | 1101 | 5.15 | 1.01 | 1.18 |
| 99 | 1 | 3.0 | 104.4 | 212 | 1092 | 5.15 | 1.02 | 1.17 |

TABLE 14

| 1st component | 2nd component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 3.1 | 130.6 | 562 | 2206 | 3.93 | 0.98 | 1.22 |
| 92 | 8 | 3.1 | 130.6 | 552 | 2168 | 3.93 | 0.99 | 1.20 |
| 95 | 5 | 3.1 | 130.5 | 538 | 2113 | 3.92 | 1.00 | 1.16 |
| 97 | 3 | 3.0 | 130.4 | 529 | 2078 | 3.92 | 1.01 | 1.14 |
| 98 | 2 | 3.0 | 130.4 | 525 | 2060 | 3.92 | 1.01 | 1.13 |
| 99 | 1 | 3.0 | 130.4 | 521 | 2043 | 3.92 | 1.02 | 1.12 |

TABLE 15

| 1st component | 2nd component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 3.1 | 151.5 | 933 | 3227 | 3.46 | 0.96 | 1.17 |
| 92 | 8 | 3.1 | 151.2 | 917 | 3166 | 3.45 | 0.97 | 1.15 |
| 95 | 5 | 3.1 | 150.9 | 894 | 3079 | 3.44 | 0.99 | 1.13 |
| 97 | 3 | 3.0 | 150.7 | 880 | 3024 | 3.44 | 1.00 | 1.11 |
| 98 | 2 | 3.0 | 150.6 | 873 | 2996 | 3.43 | 1.01 | 1.10 |
| 99 | 1 | 3.0 | 150.5 | 866 | 2970 | 3.43 | 1.01 | 1.09 |

TABLE 16

| 1st component | 2nd component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 1006 | 94.9 | 164 | 946 | 5.75 | 1.00 | 1.00 |
| 92 | 8 | 1011 | 95.1 | 167 | 958 | 5.73 | 1.00 | 1.00 |
| 95 | 5 | 1018 | 95.4 | 171 | 976 | 5.70 | 1.00 | 1.00 |
| 97 | 3 | 1023 | 95.6 | 174 | 988 | 5.68 | 1.00 | 1.00 |
| 98 | 2 | 1025 | 95.7 | 175 | 994 | 5.68 | 1.00 | 1.00 |
| 99 | 1 | 1028 | 95.7 | 177 | 1000 | 5.67 | 1.00 | 1.00 |

TABLE 17

| 1st component | 2nd component | GWP | $T_2$ [°C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 1006 | 122.0 | 432 | 1824 | 4.23 | 1.00 | 1.00 |
| 92 | 8 | 1011 | 122.2 | 438 | 1846 | 4.21 | 1.00 | 1.00 |
| 95 | 5 | 1018 | 122.5 | 447 | 1877 | 4.20 | 1.00 | 1.00 |
| 97 | 3 | 1023 | 122.7 | 454 | 1897 | 4.18 | 1.00 | 1.00 |
| 98 | 2 | 1025 | 122.8 | 457 | 1907 | 4.18 | 1.00 | 1.00 |
| 99 | 1 | 1028 | 122.9 | 460 | 1917 | 4.17 | 1.00 | 1.00 |

TABLE 18

| 1st component | 2nd component | GWP | $T_2$ [° C.] | $P_{EVA}$ [kPa] | $P_{CON}$ [kPa] | Pressure ratio [—] | Relative COP [—] | Relative CAP [—] |
|---|---|---|---|---|---|---|---|---|
| 90 | 10 | 1006 | 143.2 | 740 | 2689 | 3.63 | 1.00 | 1.00 |
| 92 | 8 | 1011 | 143.4 | 750 | 2718 | 3.62 | 1.00 | 1.00 |
| 95 | 5 | 1018 | 143.7 | 765 | 2760 | 3.61 | 1.00 | 1.00 |
| 97 | 3 | 1023 | 143.9 | 775 | 2788 | 3.60 | 1.00 | 1.00 |
| 98 | 2 | 1025 | 144.0 | 780 | 2802 | 3.59 | 1.00 | 1.00 |
| 99 | 1 | 1028 | 144.1 | 785 | 2815 | 3.59 | 1.00 | 1.00 |

From Tables 4 through 18, when being applied to a high-temperature heat pump, the heat transmission compositions according to the present invention, have higher values of the coefficient of performance and the volume capacity than those of the mixed heat transmission compositions of 1,1,1,3,3-pentafluoropropane and 1,1,1,3,3-pentafluoroprobutane described in PCT Japanese National Phase Laid-Open Patent Publication No. 2013-525720.

Example 13

30 g of working medium was put into an autoclave formed of SUS316, heated to 150° C. and kept for 5 weeks. Presence/absence of a decomposition product of the working medium and presence/absence of an isomer product of the working medium were evaluated by use of gas chromatography. Table 19 shows the results.

TABLE 19

| | Purity [GC %] | | | |
|---|---|---|---|---|
| | Before the test | | 5 weeks later | |
| Heat transmission medium | Heat transmission medium | Geometrical isomer | Heat transmission medium | Geometrical isomer |
| HFO-1234ze(E) | 99.96 | 0.01 | 99.95 | 0.01 |
| HFO-1234ze(Z) | 99.71 | 0.01 | 99.71 | 0.01 |
| HCFO-1233zd(E) | 99.97 | 0.01 | 98.96 | 1.00 |

With any of the heat transmission compositions, no thermal decomposition product was observed. As is clear from the results shown in Table 19, no isomerization reaction of HFO-1234ze advanced either from the trans isomer or the cis isomer. Regarding HCFO-1233zd, a small amount of trans isomer was confirmed to be isomerized. It is seen that the heat transmission compositions used in the present invention have high thermal stability.

Example 14

A thermal stability test was performed using cis-1,3,3,3-tetrafluoropropene (HFO-1234ze (Z)). In conformity to the sealed tube test of JIS-K-2211, "Refrigerating machine oils", 1.0 g of heat transmission composition and metal pieces (test pieces of iron, copper, and aluminum) were sealed in a glass test tube, heated to a predetermined temperature and kept for 2 weeks. The heating temperature was set to 175° C., 200° C. and 250° C. Two weeks later, the external appearance, the purity and the acid content (F⁻ ion) of the heat transmission composition were measured to evaluate the thermal stability. Table 20 shows the results.

TABLE 20

| Temperature [° C.] | HFO-1234ze(Z) Purity [GC %] | | Acid content (F⁻) [ppm] | External appearance |
|---|---|---|---|---|
| | Heat transmission medium | Geometrical isomer | | |
| Before the test | 99.78 | 0.00 | None | Colorless, transparent |
| 175 | 99.68 | 0.11 | 3 | Colorless, transparent |
| 200 | 99.63 | 0.15 | 2 | Colorless, transparent |
| 250 | 96.33 | 3.26 | 5 | Colorless, transparent |

Example 15

A thermal stability test was performed using 1,1,1,3,3-pentafluoropropane (HFC-245fa). In conformity to the sealed tube test of JIS-K-2211, "Refrigerating machine oils", 1.0 g of heat transmission composition and metal pieces (test pieces of iron, copper, and aluminum) were sealed in a glass test tube, heated to a predetermined temperature and kept for 2 weeks. The heating temperature was set to 175° C., 200° C. and 250° C. Two weeks later, the external appearance, the purity and the acid content (F⁻ ion) of the heat transmission composition were measured to evaluate the thermal stability. Table 21 shows the results.

TABLE 21

| Temperature [° C.] | HFC-245fa Purity [GC %] | Acid content (F⁻) [ppm] | External appearance |
|---|---|---|---|
| Before the test | 99.97 | None | Colorless, transparent |
| 175 | 99.97 | <1 | Colorless, transparent |
| 200 | 99.97 | <1 | Colorless, transparent |
| 250 | 99.97 | <1 | Colorless, transparent |

As is clear from the results shown in Tables 20 and 21, no thermal decomposition product of cis-1,3,3,3-tetrafluoropropene or 1,1,1,3,3-pentafluoropropane was observed. The acid content (F⁻) as a byproduct after the thermal stability test was minute. It is seen that the heat transmission compositions used in the present invention have high thermal stability even in a high-temperature state.

Example 16

In conformity to the compatibility test of a heat transmission composition and a refrigerating machine oil of WS-K-2211, "Refrigerating machine oils", 1.7 g of heat transmission composition and 0.3 g of refrigerating machine oil were put into a thick glass test tube and cooled with liquid nitrogen to solidity a mixture of the heat transmission composition and the refrigerating machine oil. After the mixture of the heat transmission composition and the refrigerating machine oil was solidified, a top part of the test tube and a vacuum pump were connected with each other to remove the remaining air, and the top part of the test tube was sealed by use of a gas burner. The sealed thick glass test tube was put into a thermostatic tank cooled to −20° C., and kept still until the temperature of the thermostatic tank and the temperature of the composition in the glass test tube became equal to each other. Then, the compatibility of the heat transmission composition and the refrigerating machine oil was evaluated by a visual check. The compatibility was evaluated while the temperature of the thermostatic tank was changed from −20 to +80° C. Tables 22 through 26 show the results. In Tables 22 through 26, "o" indicates that the coolant and the refrigerating machine oil were uniformly mixed, and "x" indicates that the coolant and the refrigerating machine oil were separated into two layers or that the composition was clouded.

For the compatibility test, the following five types of lubricant were used.

Mineral oil (MO): SUNISO 4GS (produced by Japan Sun Oil Company, Ltd.)

Polyolester oil (POE): SUNICE T68 (produced by Japan Sun Oil Company, Ltd.)

Alkylbenzene oil (AB): ATMOS 68N (produced by JX Nippon Oil & Energy Corporation)

Polyalkyleneglycol oil (PAG): SUNICE P56 (produced by Japan Sun Oil Company, Ltd.)

Polyvinylether oil (PVE): Daphne Hermetic Oil FVC68D (produced by Idemitsu Kosan Co., Ltd.)

TABLE 22

Refrigerating machine oil: mineral oil (SUNISO 4GS)

| Temperature [° C.] | HFO-1234ze (E) | HFO-1234ze (Z) | HCFO-1233zd (E) | HCFO-1233zd (Z) |
|---|---|---|---|---|
| −20 | x | x | o | o |
| 0 | x | x | o | o |
| 20 | x | x | o | o |
| 40 | x | x | o | o |
| 60 | x | x | o | o |
| 80 | x | x | o | o |

TABLE 23

Refrigerating machine oil: Polyolester oil (SUNICE T68)

| Temperature [° C.] | HFO-1234ze (E) | HFO-1234ze (Z) | HCFO-1233zd (E) | HCFO-1233zd (Z) |
|---|---|---|---|---|
| −20 | o | o | o | o |
| 0 | o | o | o | o |
| 20 | o | o | o | o |
| 40 | o | o | o | o |
| 60 | o | o | o | o |
| 80 | o | o | o | o |

TABLE 24

Refrigerating machine oil: Alkylbenzene oil (ATMOS 68N)

| Temperature [° C.] | HFO-1234ze (E) | HFO-1234ze (Z) | HCFO-1233zd (E) | HCFO-1233zd (Z) |
|---|---|---|---|---|
| −20 | x | x | o | o |
| 0 | x | x | o | o |
| 20 | x | x | o | o |
| 40 | x | x | o | o |
| 60 | x | x | o | o |
| 80 | x | x | o | o |

TABLE 25

Refrigerating machine oil: Polyalkyleneglycol oil (SUNICE P56)

| Temperature [° C.] | HFO-1234ze (E) | HFO-1234ze (Z) | HCFO-1233zd (E) | HCFO-1233zd (Z) |
|---|---|---|---|---|
| −20 | o | o | o | o |
| 0 | o | o | o | o |
| 20 | o | o | o | o |
| 40 | o | o | o | o |
| 60 | o | o | o | o |
| 80 | o | o | o | o |

TABLE 26

Refrigerating machine oil: Polyvinylether oil (Daphne Hermetic Oil FVC68D)

| Temperature [° C.] | HFO-1234ze (E) | HFO-1234ze (Z) | HCFO-1233zd (E) | HCFO-1233zd (Z) |
|---|---|---|---|---|
| −20 | o | o | o | o |
| 0 | o | o | o | o |
| 20 | o | o | o | o |
| 40 | o | o | o | o |
| 60 | o | o | o | o |
| 80 | o | o | o | o |

All the heat transmission compositions exhibited good compatibility with POE, which was synthetic oil. Regarding HCFO-1233zd containing a chlorine atom, both of the trans isomer and the cis isomer exhibited good compatibility also with the mineral oil.

INDUSTRIAL APPLICABILITY

The present invention is directed to a heat transmission method of transmitting, by a condensation step, heat of a non-flammable or slightly flammable heat transmission composition having little load on the environment to a fluid to be heated. Under the heat transmission temperature condition of 70° C. or higher, this method is usable more preferably than a conventional heat transmission method using a condensation step of a hydrofluorocarbon heat transmission composition. This method, which provides a superb coefficient of performance and a superb volume capacity, significantly contributes to reduction of power consumption. Warm water in a middle to low temperature range, which is not fully utilized conventionally, may be heated by the method according to the present invention and used as high quality warm water, pressurized hot water or superheated steam.

The heat transmission composition according to the present invention is usable as a non-flammable or slightly flammable mixed coolant for a heat cycle that has little influence on the environment and has superb heat transmission characteristics. By use of the heat transmission composition according to the present invention, a high-temperature heat pump device exhibiting superb heat transmission characteristics is provided.

The invention claimed is:

1. A heat transmission method using a high-temperature heat pump system accommodating a heat transmission composition, the heat transmission method including the step of gasifying the heat transmission composition, the step of compressing the heat transmission composition, the step of condensing the heat transmission composition, and the step of decreasing the pressure of the heat transmission composition, the steps are performed sequentially;

wherein the heat transmission composition contains cis-1,3,3,3-tetrafluoropropene at a mass ratio of 95.0% by mass or more and 99.9% by mass or less, and contains trans-1,3,3,3-tetrafluoropropene or 2,3,3,3-tetrafluoropropene at a mass ratio of 0.1% by mass or more and 5.0% by mass or less; and the heat transmission composition has a condensation temperature of 70° C. or higher, and a temperature of the heat transmission composition at the end of the step of compressing the heat transmission composition is lower than a critical temperature of cis-1,3,3,3-tetrafluoropropene, or a pressure of the heat transmission composition at the end of the step of compressing the heat transmission composition is lower than a critical pressure of cis-1,3,3,3-tetrafluoropropene.

2. The heat transmission method according to claim 1, wherein the heat transmission composition contains a lubricant.

3. The heat transmission method according to claim 2, wherein the lubricant is selected from mineral oil (paraffin-based oil or naphthene-based oil), and synthetic oils including alkylbenzenes (AB), poly(alfa-olefin), esters, polyolesters (POE), polyalkyleneglycols (PAG), polyvinylethers (PVE), and a combination thereof.

4. The heat transmission method according to claim 1, wherein the heat transmission composition further contains a stabilizer.

5. The heat transmission method according to claim 3, wherein the stabilizer is selected from nitro compounds, epoxy compounds, phenols, imidazoles, amines, diene-based compounds, phosphates, aromatic unsaturated hydrocarbons, isoprenes, propadienes, terpenes, and a combination thereof.

6. The heat transmission method according to claim 1, wherein the heat transmission composition further contains a flame retardant.

7. The heat transmission method according to claim 6, wherein the flame retardant is selected from phosphates, halogenated aromatic compounds, fluorinated iodocarbon, fluorinated bromocarbon, and a combination thereof.

8. The heat transmission method according to claim 1, wherein warm water, pressurized hot water or superheated steam of 60° C. or higher is generated.

9. The heat transmission method according to claim 1, wherein warm water, pressurized hot water or superheated steam of 80° C. or higher is generated.

10. The heat transmission method according to claim 1, wherein pressurized hot water or superheated steam of 110° C. or higher is generated.

11. A high-temperature heat pump device using the heat transmission method according to claim 1.

12. The heat transmission method according to claim 1, wherein the step of compressing the heat transmission composition supplies a high-pressure superheated vapor of the heat transmission composition to the step of condensing the heat transmission composition.

13. The heat transmission method according to claim 12, wherein the step of condensing the heat transmission composition subjects the high-pressure superheated vapor of the heat transmission composition to heat exchange with a fluid to be heated, so that the heat transmission composition is liquefied.

14. The heat transmission method according to claim 1, wherein the temperature of the heat transmission composition containing cis-1,3,3,3-tetrafluoropropene at a mass ratio of 95.0% by mass or more and 99.9% by mass or less and trans-1,3,3,3-tetrafluoropropene at a mass ratio of 0.1% by mass or more and 5.0% by mass or less at the end of the step of compressing the heat transmission composition is 150.9° C. or lower and the pressure of the heat transmission composition containing cis-1,3,3,3-tetrafluoropropene at a mass ratio of 95.0% by mass or more and 99.9% by mass or less and trans-1,3,3,3-tetrafluoropropene at a mass ratio of 0.1% by mass or more and 5.0% by mass or less at the end of the step of compressing the heat transmission composition is 3066 kPa or lower.

15. The heat transmission method according to claim 1, wherein the temperature of the heat transmission composition containing cis-1,3,3,3-tetrafluoropropene at a mass ratio of 95.0% by mass or more and 99.9% by mass or less and 2,3,3,3-tetrafluoropropene at a mass ratio of 0.1% by mass or more and 5.0% by mass or less at the end of the step of compressing the heat transmission composition is 150.9° C. or lower and the pressure of the heat transmission composition containing cis-1,3,3,3-tetrafluoropropene at a mass ratio of 95.0% by mass or more and 99.9% by mass or less and 2,3,3,3-tetrafluoropropene at a mass ratio of 0.1% by mass or more and 5.0% by mass or less at the end of the step of compressing the heat transmission composition is 3079 kPa or lower.

16. The heat transmission method according to claim 1, wherein the temperature of the heat transmission composition containing cis-1,3,3,3-tetrafluoropropene at a mass ratio of 95.0% by mass or more and 99.9% by mass or less and trans-1,3,3,3-tetrafluoropropene at a mass ratio of 0.1% by mass or more and 5.0% by mass or less at the end of the step of compressing the heat transmission composition is 150.9° C. or lower and the pressure of the heat transmission composition containing cis-1,3,3,3-tetrafluoropropene at a mass ratio of 95.0% by mass or more and 99.9% by mass or less and trans-1,3,3,3-tetrafluoropropene at a mass ratio of 0.1% by mass or more and 5.0% by mass or less at the end of the step of compressing the heat transmission composition is 3066 kPa or lower and the condensation temperature of the heat transmission composition is 140° C. or lower.

17. The heat transmission method according to claim 1, wherein the temperature of the heat transmission composition containing cis-1,3,3,3-tetrafluoropropene at a mass ratio of 95.0% by mass or more and 99.9% by mass or less and 2,3,3,3-tetrafluoropropene at a mass ratio of 0.1% by mass or more and 5.0% by mass or less at the end of the step of compressing the heat transmission composition is 150.9° C. or lower and the pressure of the heat transmission composition containing cis-1,3,3,3-tetrafluoropropene at a mass ratio of 95.0% by mass or more and 99.9% by mass or less and 2,3,3,3-tetrafluoropropene at a mass ratio of 0.1% by mass or more and 5.0% by mass or less at the end of the step of compressing the heat transmission composition is 3079 kPa or lower and the condensation temperature of the heat transmission composition is 140° C. or lower.

* * * * *